US012754631B2

(12) United States Patent
Lee

(10) Patent No.: US 12,754,631 B2
(45) Date of Patent: Oct. 6, 2026

(54) SENSOR DEVICE AND METHOD OF DRIVING THE SAME

(71) Applicant: SAMSUNG DISPLAY CO., LTD., Yongin-si (KR)

(72) Inventor: Choon Hyop Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 21 days.

(21) Appl. No.: 18/775,223

(22) Filed: Jul. 17, 2024

(65) Prior Publication Data

US 2025/0036232 A1 Jan. 30, 2025

(30) Foreign Application Priority Data

Jul. 27, 2023 (KR) ........................ 10-2023-0098515

(51) Int. Cl.
*G06F 3/041* (2006.01)
*G06F 3/044* (2006.01)

(52) U.S. Cl.
CPC ...... *G06F 3/04164* (2019.05); *G06F 3/04182* (2019.05); *G06F 3/0446* (2019.05)

(58) Field of Classification Search
CPC ............ G06F 3/04164; G06F 3/04182; G06F 3/0446
USPC .......................................................... 345/173
See application file for complete search history.

(56) References Cited

U.S. PATENT DOCUMENTS

| | | | |
|---|---|---|---|
| 9,298,294 B2 | 3/2016 | Takeuchi et al. | |
| 10,216,314 B2 | 2/2019 | Kremin et al. | |
| 2014/0002410 A1* | 1/2014 | Lillie | G06F 3/0443 345/174 |
| 2017/0228096 A1* | 8/2017 | Nathan | G06F 3/041661 |

FOREIGN PATENT DOCUMENTS

| | | |
|---|---|---|
| KR | 10-1721701 | 3/2017 |

* cited by examiner

*Primary Examiner* — Mark Edwards
(74) *Attorney, Agent, or Firm* — F. CHAU & ASSOCIATES, LLC

(57) ABSTRACT

A sensor device includes sensing areas, first sensor electrodes and second sensor electrodes forming capacitors at intersections of the first and second sensor electrodes, and a sensor driver time-divisionally senses each of the sensing areas once during a first sensing frame period, time-divisionally senses each of the sensing areas once during a second sensing frame period, and sets an initial sensing area to be sensed during an initial second sensing period of the second sensing frame period to be different from a last sensing area sensed during a last first sensing period of the first sensing frame period.

20 Claims, 18 Drawing Sheets

FIG. 11 time

| | | AR1 | AR2 | AR3 | AR4 |
|---|---|---|---|---|---|
| SSF1 | SP1 | O | | | |
| | SP2 | X | | O | |
| | SP3 | X | | X | O |
| | SP4 | X | O | X | X |
| SSF2 | SP5 | | X | O | |
| | SP6 | O | | X | |
| | SP7 | X | | X | O |
| | SP8 | X | O | X | X |
| | ⋮ | | | | |
| SSF14 | SP53 | | O | X | |
| | SP54 | | X | | O |
| | SP55 | | X | O | X |
| | SP56 | O | X | X | X |
| SSF15 | SP57 | X | | O | |
| | SP58 | | | X | O |
| | SP59 | | O | X | X |
| | SP60 | O | X | X | X |
| | total | 15 | 15 | 15 | 15 |

SENSOR DEVICE AND METHOD OF DRIVING THE SAME

This application claims priority to Korean Patent Application No. 10-2023-0098515, filed on Jul. 27, 2023, and all the benefits accruing therefrom under 35 U.S.C. § 119, the content of which in its entirety is herein incorporated by reference.

BACKGROUND

1. Field

The disclosure relates to a sensor device and a method of driving the same.

2. Description of the Related Art

As information technology develops, the importance of a display device, which is a connection medium between a user and information, has been highlighted, and the use of a display device such as a liquid crystal display device and an organic light emitting display device is increasing.

The display device may include a sensor device which senses a touch of a user corresponding to an image of the display device and uses the touch as an input signal. Driving signals supplied to sensors of the sensor device may act as a noise to the display device, and thus display quality may be reduced. Conversely, signals for displaying an image of the display device may act as noise to the sensor device, and thus sensing sensitivity may be reduced.

To avoid electromagnetic interference (EMI), a method of changing a frequency band of the driving signal of the sensor device has been proposed, but since various frequency bands are already in use, an additional appropriate frequency band is difficult to find. To avoid the EMI, a method of reducing a magnitude of the driving signal of the sensor device is also proposed, but a problem in that a signal to noise ratio (SNR) is reduced exists.

SUMMARY

A technical object to be solved is to provide a sensor device and a method of driving the same capable of reducing noise without changing a magnitude and a frequency band of a driving signal.

According to an aspect of the present disclosure, a sensor device includes a sensor unit including a plurality of first sensor electrodes and a plurality of second sensor electrodes, wherein the plurality of first and second sensor electrodes are configured to form a plurality of capacitors at a plurality of intersections of the plurality of first and second sensor electrodes, and a sensor driver configured to transmit a plurality of driving signals to the plurality of first sensor electrodes and receive a plurality of sensing signals from the plurality of second sensor electrodes. The sensor unit includes a plurality of sensing areas. A number of the plurality of sensing areas is NA, which is an integer greater than 2. The sensor driver time-divisionally senses each of the plurality of sensing areas once during a first sensing frame period, wherein the first sensing frame period includes a plurality of first sensing periods, and a number of the plurality of first sensing periods is equal to the number of the plurality of sensing areas, time-divisionally senses each of the plurality of sensing areas once during a second sensing frame period including a plurality of second sensing periods, wherein a number of the plurality of second sensing periods is equal to the number of the plurality of sensing areas, and sets an initial sensing area among the plurality of sensing areas to be sensed during an initial second sensing period of the second sensing frame period to be different from a last sensing area among the plurality of sensing areas sensed during a last first sensing period of the first sensing frame period.

An order in which each of the plurality of sensing areas is randomly sensed during the first sensing frame period is different from an order in which each of the plurality of sensing areas is randomly sensed during the second sensing frame period.

The plurality of first sensor electrodes are grouped into the plurality of sensing areas, and each of the plurality of sensing areas has the same number of first sensor electrodes.

The plurality of sensing areas share the plurality of second sensor electrodes.

The sensor driver selects and senses one of the plurality of sensing areas with a probability of (1/NA) during an initial first sensing period among the plurality of first sensing periods of the first sensing frame period.

The sensor driver selects and senses one of (NA−1) other sensing areas among the plurality of sensing areas with a probability of 1/(NA−1) during a following first sensing period, immediately after the initial first sensing period, among the plurality of first sensing periods of the first sensing frame period. The (NA−1) other sensing areas exclude the one of the plurality of sensing areas sensed during the initial first sensing period of the first sensing frame period.

The sensor driver selects and senses one of (NA−2) other sensing areas among the plurality of sensing areas with a probability of 1/(NA−2) during a third first sensing period, immediately after the following first sensing period, among the plurality of first sensing periods of the first sensing frame period. The (NA−2) other sensing areas exclude the one of the plurality of sensing areas sensed during the initial first sensing period of the first sensing frame period and the one of the (NA−1) other sensing areas sensed during the following first sensing period of the first sensing frame period.

The sensor driver selects and senses the initial sensing area among first (NA−1) sensing areas with a probability of 1/(NA−1) during the initial second sensing period of the second sensing frame period. The first (NA−1) sensing areas exclude the last sensing area sensed during the last first sensing period of the first sensing frame period.

The sensor driver selects and senses one of second (NA−1) sensing areas with a probability of 1/(NA−1) during a following second sensing period, immediately after the initial second sensing period, of the second sensing frame period. The second (NA−1) sensing areas include the last sensing area and exclude the initial sensing area of the first (NA−1) sensing areas.

The sensor driver selects and senses one of (NA−2) sensing areas with a probability of 1/(NA−2) during a third second sensing period, immediately after the following second sensing period, of the second sensing frame period. The (NA−2) sensing areas exclude the initial sensing area and the one of second (NA−1) sensing areas.

According to an aspect of the present disclosure, a method of driving a sensor device including a sensor unit, which includes a plurality of first sensor electrodes and a plurality of second sensor electrodes, wherein the plurality of first and second sensor electrodes are configured to form a plurality of capacitors at a plurality of intersections of the plurality of first and second sensor electrodes, and includes a plurality of sensing areas, a number of the plurality of sensing areas being NA (NA is an integer greater than 2), includes time-divisionally sensing each of the plurality of sensing areas once during a first sensing frame period, wherein the first sensing frame period includes a plurality of first sensing periods, and a number of the plurality of first sensing periods is equal to the number of the plurality of sensing areas, and time-divisionally sensing each of the plurality of sensing areas once during a second sensing frame period including a plurality of second sensing periods, wherein a number of the plurality of second sensing periods is equal to the number of the plurality of sensing areas. An initial sensing area among the plurality of sensing areas to be sensed during an initial second sensing period of the second sensing frame period is different from a last sensing area among the plurality of sensing areas sensed during a last first sensing period of the first sensing frame period.

An order in which each of the plurality of sensing areas is randomly sensed during the first sensing frame period is different from an order in which each of the plurality of sensing areas is randomly sensed during the second sensing frame period.

The plurality of first sensor electrodes are grouped into the plurality of sensing areas, and each of the plurality of sensing areas has the same number of first sensor electrodes.

The plurality of sensing areas share the plurality of second sensor electrodes.

One of the plurality of sensing areas is selected and sensed with a probability of (1/NA) during an initial first sensing period among the plurality of first sensing periods of the first sensing frame period.

One of (NA−1) other sensing areas among the plurality of sensing areas is selected and sensed with a probability of 1/(NA−1) during a following first sensing period, immediately after the initial first sensing period, among the plurality of first sensing periods of the first sensing frame period. The (NA−1) other sensing areas exclude the one of the plurality of sensing areas sensed during the initial first sensing period of the first sensing frame period.

One of (NA−2) other sensing areas among the plurality of sensing areas is selected and sensed with a probability of 1/(NA−2) during a third first sensing period, immediately after the following first sensing period, among the plurality of first sensing periods of the first sensing frame period. The (NA−2) other sensing areas exclude the one of the plurality of sensing areas sensed during the initial first sensing period of the first sensing frame period and the one of the (NA−1) other sensing areas sensed during the following first sensing period of the first sensing frame period.

The initial sensing area among first (NA−1) sensing areas is selected and sensed with a probability of 1/(NA−1) during the initial second sensing period of the second sensing frame period. The first (NA−1) sensing areas exclude the last sensing area sensed during the last first sensing period of the first sensing frame period.

One of second (NA−1) sensing areas is selected and sensed with a probability of 1/(NA−1) during a following second sensing period, immediately after the initial second sensing period, of the second sensing frame period. The second (NA−1) sensing areas include the last sensing area and exclude the initial sensing area of the first (NA−1) sensing areas.

One of (NA−2) sensing areas is selected and sensed with a probability of 1/(NA−2) during a third second sensing period, immediately after the following second sensing period, of the second sensing frame period. The (NA−2) sensing areas exclude the initial sensing area and the one of second (NA−1) sensing areas.

The sensor device and the method of driving the same according to the disclosure may reduce noise without changing a magnitude and a frequency band of a driving signal.

BRIEF DESCRIPTION OF THE DRAWINGS

The above and other features of the disclosure will become more apparent by describing in further detail embodiments thereof with reference to the accompanying drawings, in which:

FIG. 11 is a diagram illustrating a configuration of sensing frames according to an embodiment of the disclosure;

DETAILED DESCRIPTION OF THE EMBODIMENT

Figure 1:
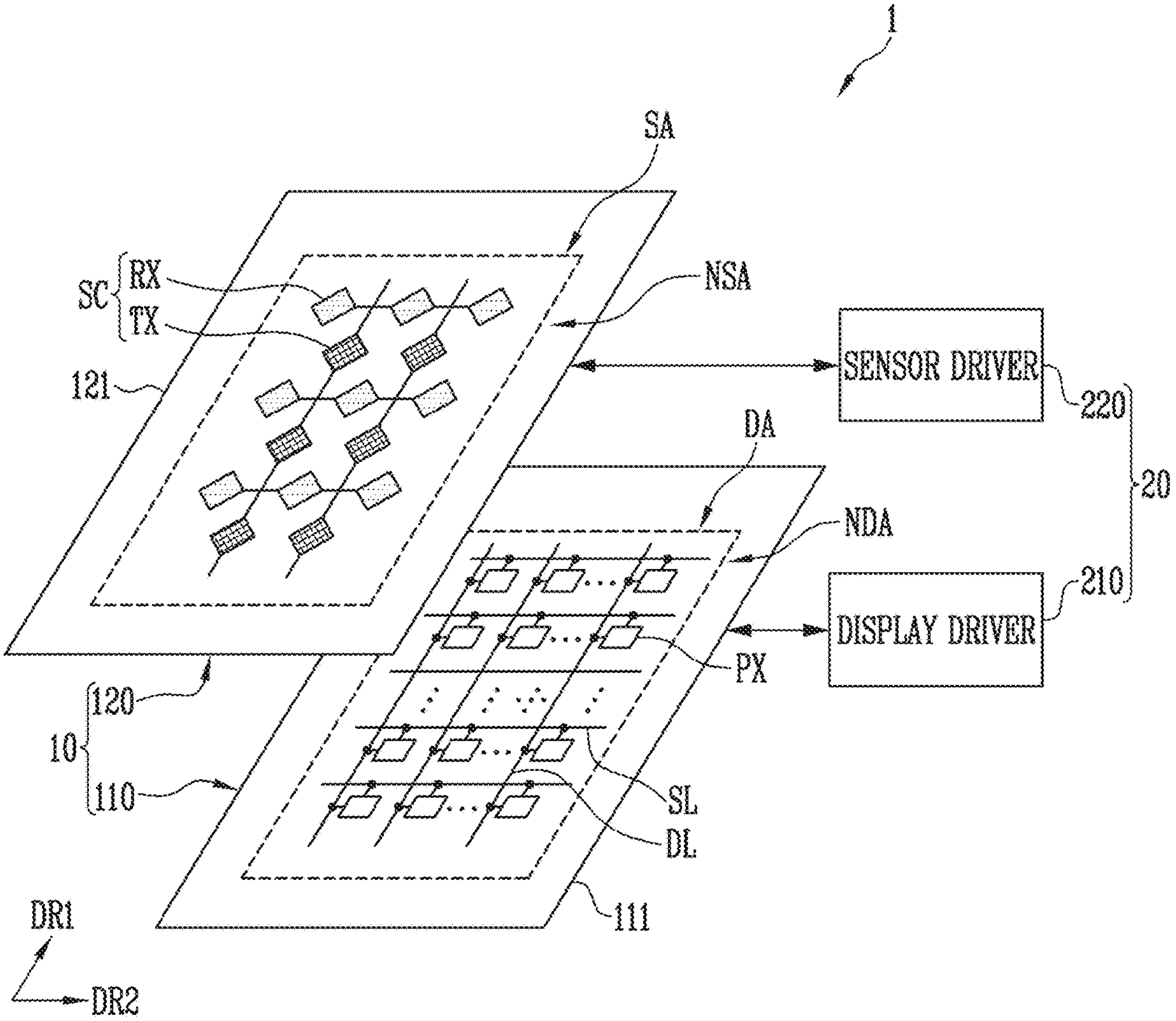
FIG. 1 is a diagram illustrating a display device according to an embodiment of the disclosure.

Hereinafter, various embodiments of the disclosure will be described in detail with reference to the accompanying drawings so that those skilled in the art may easily carry out the disclosure. The disclosure may be implemented in various different forms and is not limited to the embodiments described herein.

In order to clearly describe the disclosure, parts that are not related to the description are omitted, and the same or similar elements are denoted by the same reference numerals throughout the specification. Therefore, the above-described reference numerals may be used in other drawings.

Sizes and thicknesses of each component shown in the drawings are arbitrarily shown for convenience of description, and thus the disclosure is not necessarily limited to those shown in the drawings. In the drawings, thicknesses may be exaggerated to clearly express various layers and areas.

An expression "is the same" in the description may mean "is substantially the same". That is, the expression "is the same" may be the same enough for those of ordinary skill to understand that it is the same. Other expressions may also be expressions in which "substantially" is omitted.

FIG. 1 is a diagram illustrating a display device according to an embodiment of the disclosure.

Referring to FIG. 1, the display device 1 according to an embodiment of the disclosure may include a panel 10 and a driving circuit 20 for driving the panel 10. For example, the panel 10 may include a display unit 110 for displaying an image and a sensor unit 120 for sensing an input such as touch, pressure, fingerprint, and hovering. For example, the panel 10 may include pixels PX and sensors SC positioned to overlap at least a portion of the pixels PX. In an embodiment, the sensors SC may include first sensors TX(i.e., first sensor electrodes or first sensor lines) and second sensors RX(i.e., second sensor electrodes or second sensor lines). In an embodiment (for example, in a self-capacitive touch sensor), the sensors SC may include a single sensor electrode and may measure the change in capacitance with respect to ground caused by a typical user's touch.

The driving circuit 20 may include a display driver 210 for driving the display unit 110 and a sensor driver 220 for driving the sensor unit 120. For example, the pixels PX may display an image in a display frame period unit. For example, the sensors SC may sense an input of a user in a sensing frame period unit. A sensing frame period and a display frame period may be independent of each other and may be different from each other. The sensing frame period and the display frame period may be synchronized with each other or may be asynchronous. In an example, the sensing frame period and the display frame period may be equal to each other.

According to an embodiment, the display unit 110 and the sensor unit 120 may be separately manufactured, and then disposed and/or combined so that the pixels PX of the display unit 110 and the sensors SC of the sensor unit 120 may overlap each other at least one area. In an embodiment, the display unit 110 and the sensor unit 120 may be integrally manufactured. For example, the sensor unit 120 may be directly formed on at least one substrate configuring the display unit 110 (for example, an upper substrate and/or a lower substrate of the display panel, or a thin film encapsulation layer), or other insulating layers or various types of functional layer (for example, an optical layer or a protective layer).

Referring to FIG. 1, the sensor unit 120 is disposed on a front surface (for example, an upper surface on which an image is displayed) of the display unit 110, but a position of the sensor unit 120 is not limited thereto. For example, in an embodiment, the sensor unit 120 may be disposed on a back surface or both surfaces of the display unit 110. In an embodiment, the sensor unit 120 may be disposed on at least one edge area of the display unit 110.

The display unit 110 may include a display substrate 111 and a plurality of pixels PXL formed on the display substrate 111. The pixels PXL may be disposed in a display area DA of the display substrate 111.

The display substrate 111 may include the display area DA where an image is displayed and a non-display area NDA outside the display area DA. According to an embodiment, the display area DA may be disposed in a center area of the display unit 110, and the non-display area NDA may be disposed in an edge area of the display unit 110 to surround the display area DA.

The display substrate 111 may be a rigid substrate or a flexible substrate, and a material or a physical property thereof is not particularly limited. For example, the display substrate 111 may be a rigid substrate formed of organic or tempered glass, or a flexible substrate formed of a thin film of a plastic or metal material.

Scan line SL, data lines DL, and the pixels PXL connected to the scan lines SL and the data lines DL are disposed in the display area DA. The pixels PX are selected by a scan signal of a turn-on level supplied from the scan lines SL, receive a data signal from the data lines DL, and emit light of a luminance corresponding to the data signal. Therefore, an image corresponding to the data signal is displayed in the display area DA. The structure of the pixels PXL and the driving method thereof are not particularly limited. For example, each of the pixels PXL may be implemented with a pixel employing various structures and driving methods.

In the non-display area NDA, various lines and/or a built-in circuit unit connected to the pixels PXL of the display area DA may be disposed. For example, a plurality of lines for supplying various power and control signals to the display area DA may be disposed in the non-display area NDA, and a scan driver may be further disposed in the non-display area NDA.

The type of the display unit 110 is not particularly limited. For example, the display unit 110 may be implemented as a self-emission type display panel such as an organic light emitting display panel. In an embodiment, when the display unit 110 is implemented as a self-emission type, each pixel is not limited to a case where only an organic light emitting element is included. For example, the light emitting element of each pixel may be configured of an organic light emitting diode, an inorganic light emitting diode, a quantum dot/well light emitting diode, or the like. A plurality of light emitting elements may be provided in each pixel. At this time, the plurality of light emitting elements may be connected in series, in parallel, or in series-parallel. In an embodiment, the display unit 110 may be implemented as a non-emission type display panel such as a liquid crystal display panel. When the display unit 110 is implemented as a non-emission type, the display device 1 may additionally include a light source such as a backlight unit.

The sensor unit 120 includes a sensor substrate 121 and a plurality of sensors formed on the sensor substrate 121. The sensors SC may be disposed in a sensing area SA on the sensor substrate 121.

The sensor substrate 121 may include the sensing area SA in which a touch input may be sensed, and a peripheral area NSA outside the sensing area SA. The sensing area SA may overlap the display area DA. For example, the sensing area SA may correspond to the display area DA (for example, an area overlapping the display area DA), and the peripheral area NSA may correspond to the non-display area NDA (for example, an area overlapping the non-display area NDA). When the touch input is made on the display area DA, the touch input may be detected through the sensor unit 120.

The sensor substrate 121 may be a rigid or flexible substrate, and may include or may be formed of at least one insulating layer. The sensor substrate 121 may be a transparent or translucent light-transmitting substrate, but is not limited thereto. A material and a physical property of the sensor substrate 121 are not particularly limited. For example, the sensor substrate 121 may be a rigid substrate such as glass and tempered glass, or a flexible substrate such as a thin film of a plastic or metal material. According to an embodiment, at least one substrate (for example, the display substrate 111, an encapsulation substrate, and/or a thin film encapsulation layer) configuring the display unit 110, an insulating layer, a functional layer, or at least one layer disposed in an inside and/or on an outer surface of the display unit 110 may be used as the sensor substrate 121.

The sensing area SA corresponds to an area capable of responding to the touch input (that is, an active area of a sensor). To this end, the sensors SC for sensing the touch input may be disposed in the sensing area SA. According to an embodiment, the sensors SC may include the first sensors TX and the second sensors RX.

For example, each of the first sensors TX may extend in a first direction DR1. The first sensors TX may be spaced apart in a second direction DR2 and arranged parallel to each other. The second direction DR2 may be different from the first direction DR1. For example, the second direction DR2 may be a direction orthogonal to the first direction DR1. In an embodiment, an extension direction and an arrangement direction of the first sensors TX may follow a conventional another configuration. Each of the first sensors TX may have a form in which first cells of a relatively large area and first bridges of a relatively narrow area may be connected with each other. In FIG. 1, each of the first cells is shown in a diamond shape, but each of the first cells may be configured in various conventional shapes such as a circle, a quadrangle, a triangle, and a mesh form. For example, the first bridges may be integrally formed on the same layer as the first cells. In an embodiment, the first bridges may be formed at a layer different from that of the first cells and may electrically connect adjacent first cells with each other.

For example, each of the second sensors RX may extend in the second direction DR2. The second sensors RX may be spaced apart in the first direction DR1 and arranged parallel to each other. In an embodiment, an extension direction and an arrangement direction of the second sensors RX may follow another conventional configuration. Each of the second sensors RX may have a form in which second cells of a relatively large area and second bridges of a relatively narrow area are connected with each other. In FIG. 1, each of the second cells is shown in a diamond shape, but may be configured in various conventional shapes such as a circle, a quadrangle, a triangle, and a mesh form. For example, the second bridges may be integrally formed on the same layer as the second cells. In an embodiment, the second bridges may be formed at a layer different from that of the second cells and may electrically connect adjacent second cells with each other.

For example, the first cells of the first sensors TX and the second cells of the second sensors RX may be formed on the same conductive layer. The first bridges of the first sensors TX and the second bridges of the second sensors RX may be formed on different conductive layers with an insulating layer interposed therebetween. For example, when the first bridges of the first sensors TX are formed on the same layer as the first cells and the second cells, the second bridges of the second sensors RX may be formed on another layer with the first bridges, the first cells, and the second cells with the insulating layer interposed therebetween. When the second bridges of the second sensors RX are formed on the same layer as the first cells and the second cells, the first bridges of the first sensors TX may be formed on another layer with the second bridges, the first cells, and the second cells with the insulating layer interposed therebetween.

In an embodiment, the first cells of the first sensors TX and the second cells of the second sensors RX may be formed on different conductive layers with an insulating layer interposed therebetween. The first cells and the first bridges of the first sensors TX may be formed on the same conductive layer. The second cells and the second bridges of the second sensors RX may be formed on the same conductive layer.

According to an embodiment, each of the first sensors TX and the second sensors RX may be conductive. For example, each of the first sensors TX and the second sensors RX may include or may be formed of at least one of metal, a transparent conductive material, and various other conductive materials. For example, the first sensors TX and the second sensors RX may include or may be formed of at least one of various metal materials including gold (Au), silver (Ag), aluminum (Al), molybdenum (Mo), chromium (Cr), titanium (Ti), nickel (Ni), neodymium (Nd), copper (Cu), platinum (Pt), or an alloy thereof. The first sensors TX and the second sensors RX may be configured in a mesh form. The first sensors TX and the second sensors RX may include at least one of various transparent conductive materials including silver nanowire (AgNW), indium tin oxide (ITO), indium zinc oxide (IZO), indium gallium zinc oxide (IGZO), antimony zinc oxide (AZO), indium tin zinc oxide (ITZO), zinc oxide (ZnO), tin oxide (SnO2), carbon nano tube, or graphene. The first sensors TX and the second sensors RX may be conductive. For example, the first sensors TX and the second sensors RX may include or may be formed of at least one of various conductive materials. Each of the first sensors TX and the second sensors RX may be formed of a single layer or multiple layers, and a cross-sectional structure thereof is not particularly limited.

Sensor lines for electrically connecting the first and second sensors SC to the sensor driver 220 may be densely disposed in the peripheral area NSA of the sensor unit 120.

The driving circuit 20 may include the display driver 210 for driving the display unit 110 and the sensor driver 220 for driving the sensor unit 120. In an embodiment, the display driver 210 and the sensor driver 220 may be integrated chips (ICs) separated from each other. In an embodiment, at least a portion of the display driver 210 and the sensor driver 220 may be integrated together in one IC. In an embodiment, the display driver 210 and the sensor driver 220 may be integrated into one IC.

The display driver 210 is electrically connected to the display unit 110 to drive the pixels PX. For example, the display driver 210 may include the data driver and a timing controller, and the scan driver may be separately mounted in the non-display area NDA of the display unit 110. In an embodiment, the display driver 210 may include all or at least a portion of the data driver, the timing controller, and the scan driver.

The sensor driver 220 is electrically connected to the sensor unit 120 to drive the sensor unit 120. The sensor driver 220 may include a sensor transmitter and a sensor receiver. According to an embodiment, the sensor transmitter and the sensor receiver may be integrated into one IC, but is not limited thereto.

Figure 2:
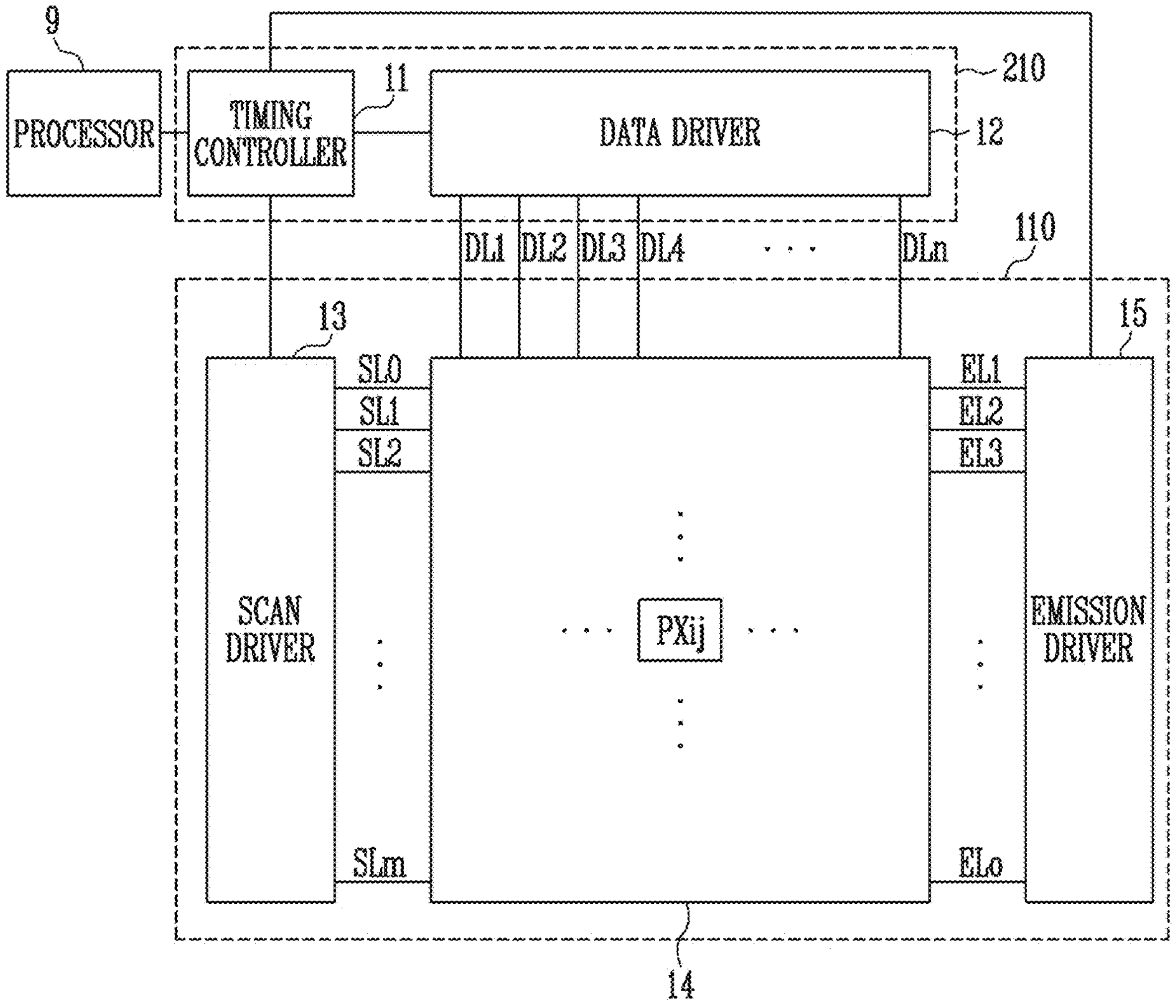
FIGS. 2 to 4 are diagrams illustrating a display unit and a display driver according to an embodiment of the disclosure.
Figure 3:
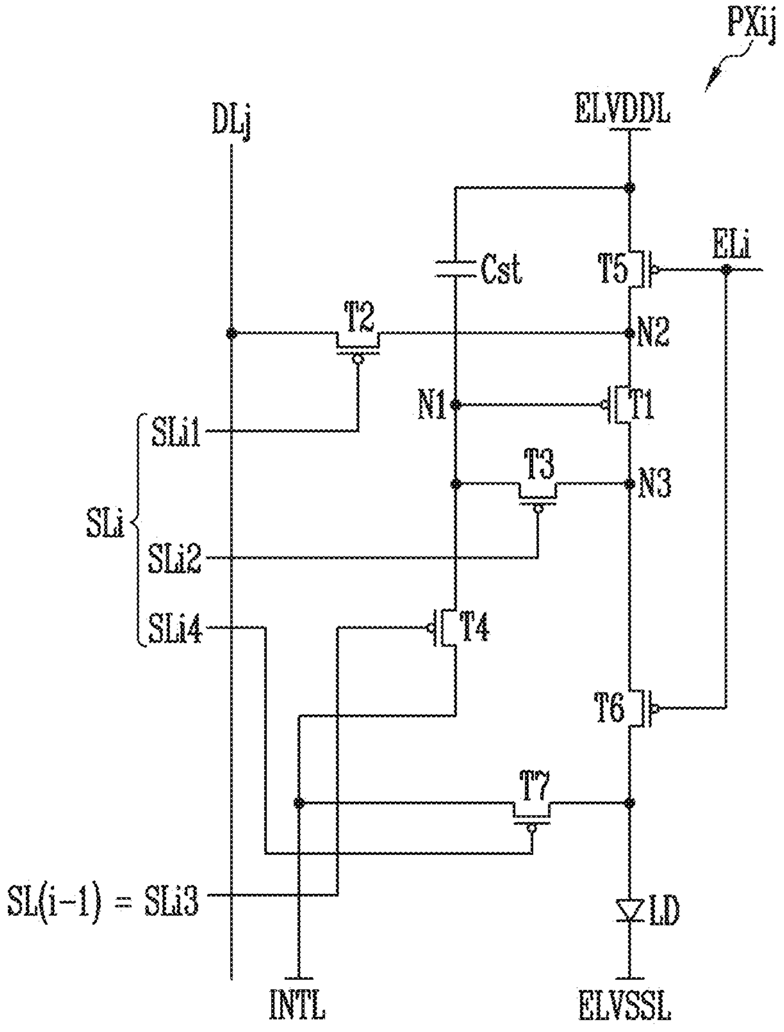
Figure 4:
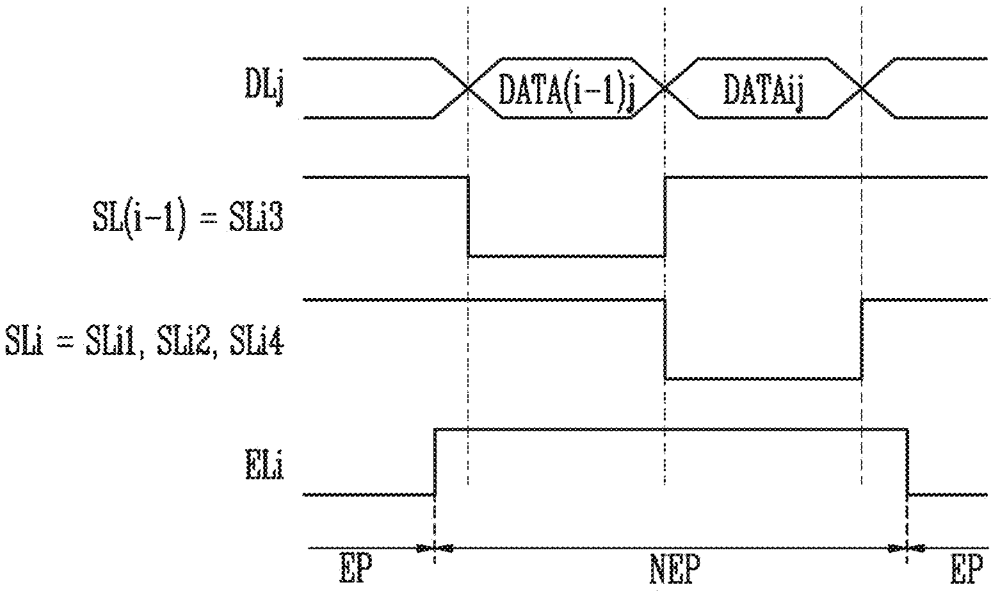

FIGS. 2 to 4 are diagrams illustrating a display unit and a display driver according to an embodiment of the disclosure.

Referring to FIG. 2, the display driver 210 may include a timing controller 11 and a data driver 12, and the display unit 110 may include a scan driver 13, a pixel unit 14, and an emission driver 15. However, as described above, whether each functional unit is integrated into one IC, into a plurality of ICs, or mounted on the display substrate 111 may be variously configured according to a specification of the display device 1.

The timing controller 11 may receive grayscales and timing signals for each frame period from a processor 9. In an embodiment, the processor may correspond to at least one of a graphics processing unit (GPU), a central processing unit (CPU), and an application processor (AP). The timing signals may include a vertical synchronization signal, a horizontal synchronization signal, or a data enable signal.

Each cycle of the vertical synchronization signal may correspond to each display frame period. Each cycle of the horizontal synchronization signal may correspond to each horizontal period. The grayscales may be supplied in a horizontal line unit in each horizontal period in response to a pulse of an enable level of the data enable signal. The horizontal line may refer to pixels (for example, a pixel row) connected to the same scan line and emission line.

The timing controller 11 may render the grayscales to correspond to the specification of the display device 1. For example, the processor 9 may provide a red grayscale, a green grayscale, and a blue grayscale for each unit dot. For example, when the pixel unit 14 has an RGB stripe structure, the pixel may correspond to each grayscale one-to-one. In this case, rendering of the grayscales may be unnecessary. However, for example, when the pixel unit 14 has a PENTILE™ structure, since adjacent unit dots share the pixel, the pixel may not correspond to each grayscale one-to-one, and rendering of the grayscales may be necessary. The grayscales which are rendered or not rendered may be provided to the data driver 12. The timing controller 11 may provide a data control signal to the data driver 12. The timing controller 11 may provide a scan control signal to the scan driver 13, and provide an emission control signal to the emission driver 15.

The data driver 12 may generate data voltages (that is, data signals) to be provided to data lines DL1, DL2, DL3, DL4, . . . , and DLn using the grayscales and the data control signal received from the timing controller 11. "n" may be an integer greater than 0.

The scan driver 13 may generate scan signals to be provided to scan lines SL0, SL1, SL2, . . . , and SLm using the scan control signal such as a clock signal and a scan start signal received from the timing controller 11. The scan driver 13 may sequentially supply scan signals having a turn-on level of pulse to the scan lines SL0 to SLm. The scan driver 13 may include scan stages configured in a form of a shift register. The scan driver 13 may generate the scan signals in a method of sequentially transferring the scan start signal which is a pulse form of a turn-on level to a next scan stage under control of the clock signal. "m" may be an integer greater than 0.

The emission driver 15 may generate emission signals to be provided to emission lines EL1, EL2, EL3, . . . , and ELo using the emission control signal such as a clock signal and an emission stop signal received from the timing controller 11. The emission driver 15 may sequentially supply emission signals having a turn-off level of pulse to the emission lines EL1 to ELo. The emission driver 15 may include emission stages configured in a form of a shift register. The emission driver 15 may generate the emission signals in a method of sequentially transferring the emission stop signal which is a pulse form of a turn-off level to a next emission stage according to control of the clock signal. "o" may be an integer greater than 0.

The pixel unit 14 includes the pixels. Each pixel PXij may be connected to corresponding data line, scan line, and emission line. The pixels may include pixels emitting light of a first color, pixels emitting light of a second color, and pixels emitting light of a third color. The first color, the second color, and the third color may be different colors. For example, the first color may be one of red, green, and blue, the second color may be one other than the first color among red, green, and blue, and the third color may be one other than the first color and the second color among red, green, and blue. In an embodiment, magenta, cyan, and yellow may be used instead of red, green, and blue as the first to third colors.

FIG. 3 is a diagram illustrating a pixel according to an embodiment of the disclosure.

Referring to FIG. 3, the pixel PXij includes transistors T1, T2, T3, T4, T5, T6, and T7, a storage capacitor Cst, and a light emitting element LD.

Hereinafter, a circuit configured of a P-type transistor is described as an example. However, those skilled in the art will be able to design a circuit configured of an N-type transistor by differentiating a polarity of a voltage applied to a gate terminal. Similarly, those skilled in the art will be able to design a circuit configured of a combination of a P-type transistor and an N-type transistor. The P-type transistor collectively refers to as a transistor in which a current amount increases when a voltage difference between a gate electrode and a source electrode increases in a negative direction. The N-type transistor collectively refers to as a transistor in which a current amount increases when a voltage difference between a gate electrode and a source electrode increases in a positive direction. The transistor may be configured in various forms such as a thin film transistor (TFT), a field effect transistor (FET), and a bipolar junction transistor (BJT).

The first transistor T1 may have a gate electrode connected to a first node N1, a first electrode connected to a second node N2, and a second electrode connected to a third node N3. The first transistor T1 may be referred to as a driving transistor.

The second transistor T2 may have a gate electrode connected to a scan line SLi1, a first electrode connected to a data line DLj, and a second electrode connected to the second node N2. The second transistor T2 may be referred to as a scan transistor.

The third transistor T3 may have a gate electrode connected to a scan line SLi2, a first electrode connected to the first node N1, and a second electrode connected to the third node N3. The third transistor T3 may be referred to as a diode connection transistor.

The fourth transistor T4 may have a gate electrode connected to a scan line SLi3, a first electrode connected to the first node N1, and a second electrode connected to an initialization line INTL. The fourth transistor T4 may be referred to as a gate initialization transistor.

The fifth transistor T5 may have a gate electrode connected to an i-th emission line Eli, a first electrode connected to a first power line ELVDDL, and a second electrode connected to the second node N2. The fifth transistor T5 may be referred to as an emission transistor. In an embodiment, the gate electrode of the fifth transistor T5 may be connected to an emission line different from an emission line connected to a gate electrode of the sixth transistor T6.

The sixth transistor T6 may have the gate electrode connected to the i-th emission line ELi, a first electrode connected to the third node N3, and a second electrode connected to an anode of the light emitting element LD. The sixth transistor T6 may be referred to as an emission transistor. In an embodiment, the gate electrode of the sixth transistor T6 may be connected to the emission line different from the emission line connected to the gate electrode of the fifth transistor T5.

The seventh transistor T7 may have a gate electrode connected to a scan line SLi4, a first electrode connected to the initialization line INTL, and a second electrode connected to the anode of the light emitting element LD. The seventh transistor T7 may be referred to as an anode initialization transistor.

A first electrode of the storage capacitor Cst may be connected to the first power line ELVDDL and a second electrode may be connected to the first node N1.

The anode of the light emitting element LD may be connected to the second electrode of the sixth transistor T6 and a cathode may be connected to a second power line ELVSSL. The light emitting element LD may be a light emitting diode. The light emitting element LD may be configured of an organic light emitting element (organic light emitting diode), an inorganic light emitting element (inorganic light emitting diode), or a quantum dot/well light emitting element (quantum dot/well light emitting diode). The light emitting element LD may emit light in any one of the first color, the second color, and the third color. In an embodiment, only one light emitting element LD may be provided in each pixel in the present embodiment. The present invention, however, is not limited thereto. In an embodiment, a plurality of light emitting elements may be provided in each pixel, and the plurality of light emitting elements may be connected in series, in parallel, or in series-parallel.

The first power line ELVDDL may be supplied with a first power voltage, the second power line ELVSSL may be supplied with a second power voltage, and the initialization line INTL may be supplied with an initialization voltage. For example, the first power voltage may be greater than the second power voltage. For example, the initialization voltage may be equal to or greater than the second power voltage. For example, the initialization voltage may correspond to a data voltage of the smallest voltage among data voltages that may be provided. In an example, a magnitude of the initialization voltage may be less than a magnitude of the data voltages that may be provided.

FIG. 4 is a diagram illustrating a method of driving the pixel of FIG. 3.

Hereinafter, for convenience of description, it is assumed that the scan lines SLi1, SLi2, and SLi4 are i-th scan lines SLi and the scan line SLi3 is an (i−1)-th scan line SL(i−1). However, a connection relationship of the scan lines SLi1, SLi2, SLi3, and SLi4 may be various according to embodiments. For example, the scan line SLi4 may be the (i−1)-th scan line or an (i+1)-th scan line.

First, an emission signal of a turn-off level (logic high level) is applied to the i-th emission line ELi, a data voltage DATA (i−1)j for an (i−1)-th pixel is applied to the data line DLj, and a scan signal of a turn-on level (logic low level) is applied to the scan line SLi3. The high/low of the logic level may vary according to whether a transistor is a P-type or an N-type.

Since a scan signal of a turn-off level is applied to the scan lines SLi1 and SLi2, the second transistor T2 is turned off and the data voltage DATA (i−1) j is prevented from being input to the pixel PXij.

Since the fourth transistor T4 is turned on, the first node N1 is connected to the initialization line INTL, and a voltage of the first node N1 is initialized. Since the emission signal of the turn-off level is applied to the emission line Ei, the transistors T5 and T6 are turned off, and unnecessary light emission of the light emitting element LD according to an initialization voltage application process is prevented.

Next, a data voltage DATAij for the i-th pixel PXij is applied to the data line DLj, and the scan signal of the turn-on level is applied to the scan lines SLi1 and SLi2. Accordingly, the transistors T2, T1, and T3 are turned on, and the data line DLj and the first node N1 are electrically connected with each other. Therefore, a compensation voltage obtained by subtracting a threshold voltage of the first transistor T1 from the data voltage DATAij is applied to the second electrode of the storage capacitor Cst (that is, the first node N1), and the storage capacitor Cst maintains a voltage corresponding to a difference between the first power voltage and the compensation voltage. Such a period may be referred to as a threshold voltage compensation period or a data writing period.

When the scan line SLi4 is the i-th scan line, since the seventh transistor T7 is turned on, the anode of the light emitting element LD and the initialization line INTL are connected with each other, and the light emitting element LD is initialized to a charge amount corresponding to a voltage difference between the initialization voltage and the second power voltage.

Thereafter, as the emission signal of the turn-on level is applied to the i-th emission line ELi, the transistors T5 and T6 may be turned on. Therefore, a driving current path connecting the first power line ELVDDL, the fifth transistor T5, the first transistor T1, the sixth transistor T6, the light emitting element LD, and the second power line ELVSSL is formed.

A driving current amount flowing to the first electrode and the second electrode of the first transistor T1 is adjusted according to the voltage maintained in the storage capacitor Cst. The light emitting element LD emits light with a luminance corresponding to the driving current amount. The light emitting element LD emits light until the emission signal of the turn-off level is applied to the emission line Ei.

When the emission signal is the turn-on level, pixels receiving the corresponding emission signal may be in a display state. Therefore, a period in which the emission signal is the turn-on level may be referred to as an emission period EP (or an emission allowable period). In addition, when the emission signal is the turn-off level, pixels receiving the corresponding emission signal may be in a non-display state. Therefore, a period in which the emission signal is the turn-off level may be referred to as a non-emission period NEP (or an emission disallowable period).

The non-emission period NEP as described with reference to FIG. 4 is for preventing the pixel PXij from emitting light with an undesired luminance during the initialization period and the data writing period.

One or more non-emission periods NEP may be additionally provided while data written to the pixel PXij is maintained (for example, one frame period). This may be for effectively expressing a low grayscale by reducing the emission period EP of the pixel PXij, or for smoothly blurring a motion of an image.

Figure 5:
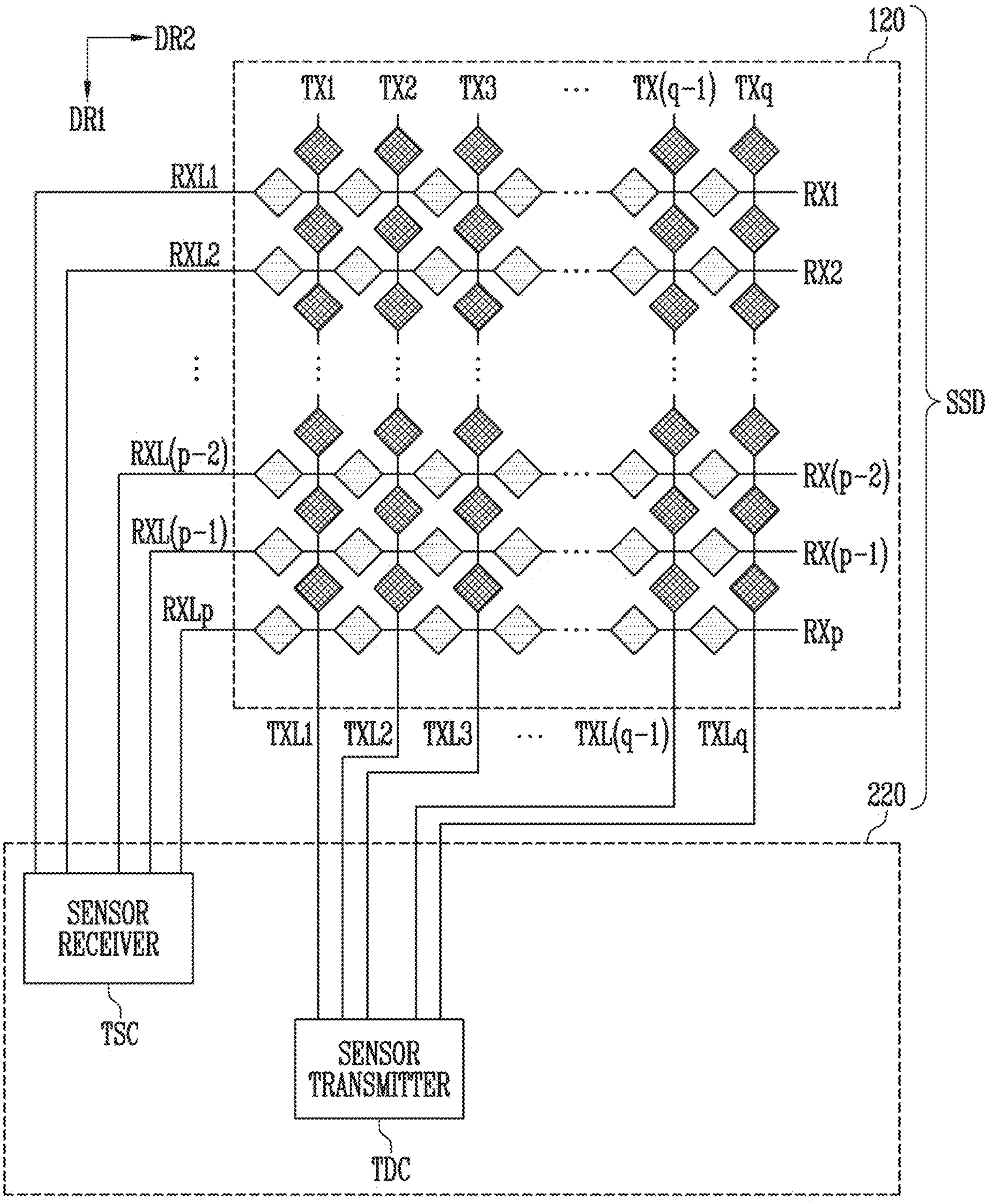
FIG. 5 is a diagram illustrating a sensor device according to an embodiment of the disclosure.

FIG. 5 is a diagram illustrating a sensor device according to an embodiment of the disclosure.

Referring to FIG. 5, the sensor device SSD according to an embodiment of the disclosure may include the sensor unit 120 and the sensor driver 220. The sensor device SSD may be included in the display device 1.

The sensor unit 120 may include first sensors (i.e., first sensor electrodes or first sensor lines) TX1, TX2, TX3, . . . , TX(q−1), and TXq and second sensors (i.e., second sensor electrodes or second sensor lines) RX1, RX2, . . . , RX(p−2), RX(p−1), and RXp. Each of p and q may be an integer greater than 0. The first sensors TX1 to TXq may extend in the first direction DR1 and may be arranged to be spaced apart in the second direction DR2 and parallel to each other. The second sensors RX1 to RXp may extend in the second direction DR2 and may be arranged to be spaced apart in the first direction DR1 and parallel to each other. The second sensors RX1 to RXp may cross the first sensors TX1 to TXq. The second sensors RX1 to RXp may form a mutual capacitance with first sensors TX1 to TXq where the second sensors RX1 to RXp cross the first sensors TX1 to TXq. The sensor driver 220 may sense a change of capacitances and determine to determine whether or not a touch of a user is input and where such touch is made on the sensing area SA.

The sensor driver 220 may include a sensor receiver TSC and a sensor transmitter TDC. The sensor transmitter TDC may be connected to the first sensors TX1 to TXq and supply driving signals to the first sensors TX1 to TXq. The sensor transmitter TDC may be connected to the first sensors TX1 to TXq through first sensor lines TXL1, TXL2, TXL3, . . . , TXL(q−1), and TXLq.

The sensor receiver TSC may be connected to the second sensors RX1 to RXp and receive sensing signals from the second sensors RX1 to RXp. The sensor receiver TSC may be connected to the second sensors RX1 to RXp through second sensor lines RXL1, RXL2, . . . , RXL(p−2), RXL (p−1), and RXLp.

Figure 6:
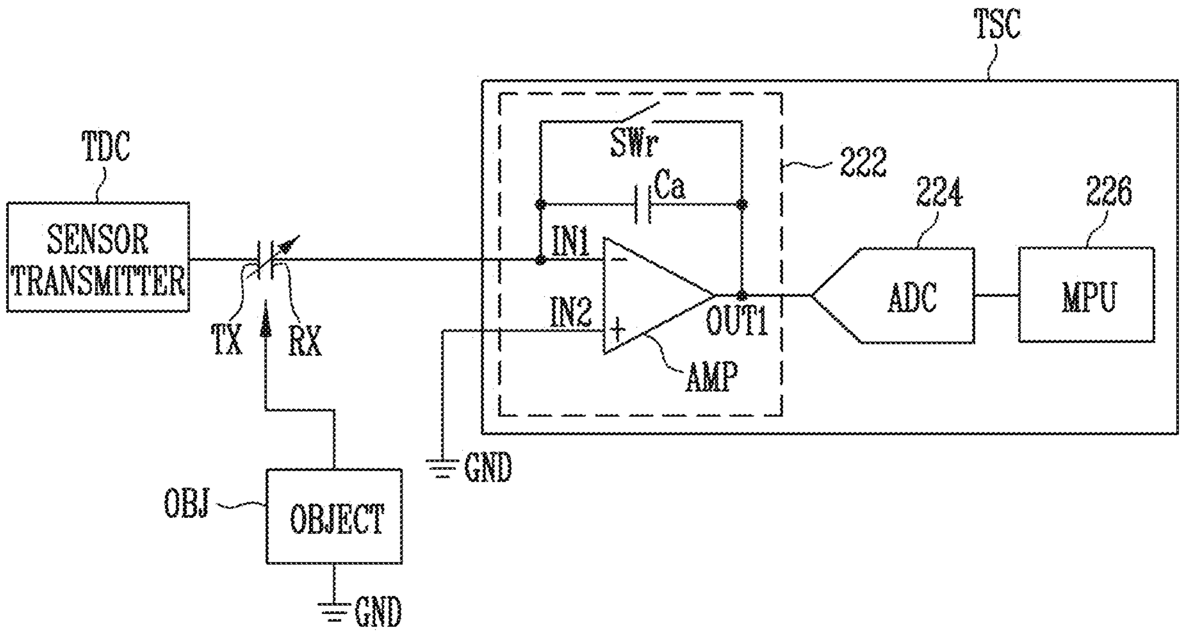
FIG. 6 is a diagram illustrating a sensor receiver according to an embodiment of the disclosure.

FIG. 6 is a diagram illustrating a sensor receiver according to an embodiment of the disclosure.

The sensor transmitter TDC may be connected to the first sensors TX, and the sensor receiver TSC may be connected to the second sensors RX. The number of second sensors RX and the number of sensor channels 222 may be the same, and the second sensors RX and the sensor channels 222 may be connected one to one. When the number of sensor channels 222 is less than the number of second sensors RX, the sensor channels 222 and the second sensors RX may be time-divisionally connected through a multiplexer.

The sensor receiver TSC may include an amplifier AMP, an analog-to-digital converter 224, and a sensor processor 226. For example, each sensor channel 222 may be implemented with an analog front end (AFE) including at least one amplifier AMP. The number of each of the analog-to-digital converters 224 and the sensor processors 226 may be less than the number of the sensor channels 222. For example, each of the analog-to-digital converter 224 and the sensor processor 226 may be shared by a plurality of sensor channels 222. According to an embodiment, the number of the analog-to-digital converters 224 may be the same as the number of the sensor channels 222.

In the amplifier AMP, a first input terminal IN1 may be connected to a corresponding second sensor, and a second input terminal IN2 may be connected to power GND. The power GND may be DC power. For example, the power GND may be ground. For example, the first input terminal IN1 may be an inverted terminal, and the second input terminal IN2 may be a non-inverted terminal.

The analog-to-digital converter 224 may be connected to an output terminal OUT1 of the amplifier AMP. A capacitor Ca and a switch SWr may be connected in parallel between the first input terminal IN1 and the output terminal OUT1.

The sensor receiver TSC may include a plurality of sensor channels 222 connected to a plurality of second sensors RX. Each of the sensor channels 222 may receive a sensing signal from a corresponding second sensor. For example, when the sensor transmitter TDC transmits driving signals to the first sensors TX, the sensor receiver TSC may sense mutual capacitances of the first sensors TX and the second sensors RX through sensing signals.

The mutual capacitance between the first sensors TX and the second sensors RX may be different from each other according to a position of an object OBJ, such as a finger of the user, on the sensing area SA, and thus the sensing signals received by sensor channels 222 may also be different from each other. The position of the object OBJ may be detected using a difference between the sensing signals.

The sensor channel 222 may generate an output signal corresponding to a voltage difference between the first and second input terminals IN1 and IN2. For example, the sensor channel 222 may amplify a difference voltage between the first and second input terminals IN1 and IN2 at a predetermined gain and may output the amplified difference voltage.

According to an embodiment, the sensor channel 222 may be implemented with an integrator including a capacitor Ca and a switch SWr that are connected in parallel between the first input terminal IN1 and the output terminal OUT1 of the amplifier AMP. For example, the switch SWr may be turned on before receiving the sensing signal, and thus charges of the capacitor Ca may be initialized. At a time point when the sensing signal is received, the switch SWr may be in a turn-off state.

The analog-to-digital converter 224 converts an analog signal input from each of the sensor channels 222 into a digital signal. The sensor processor 226 may analyze the digital signal to detect a user input.

Figure 7:
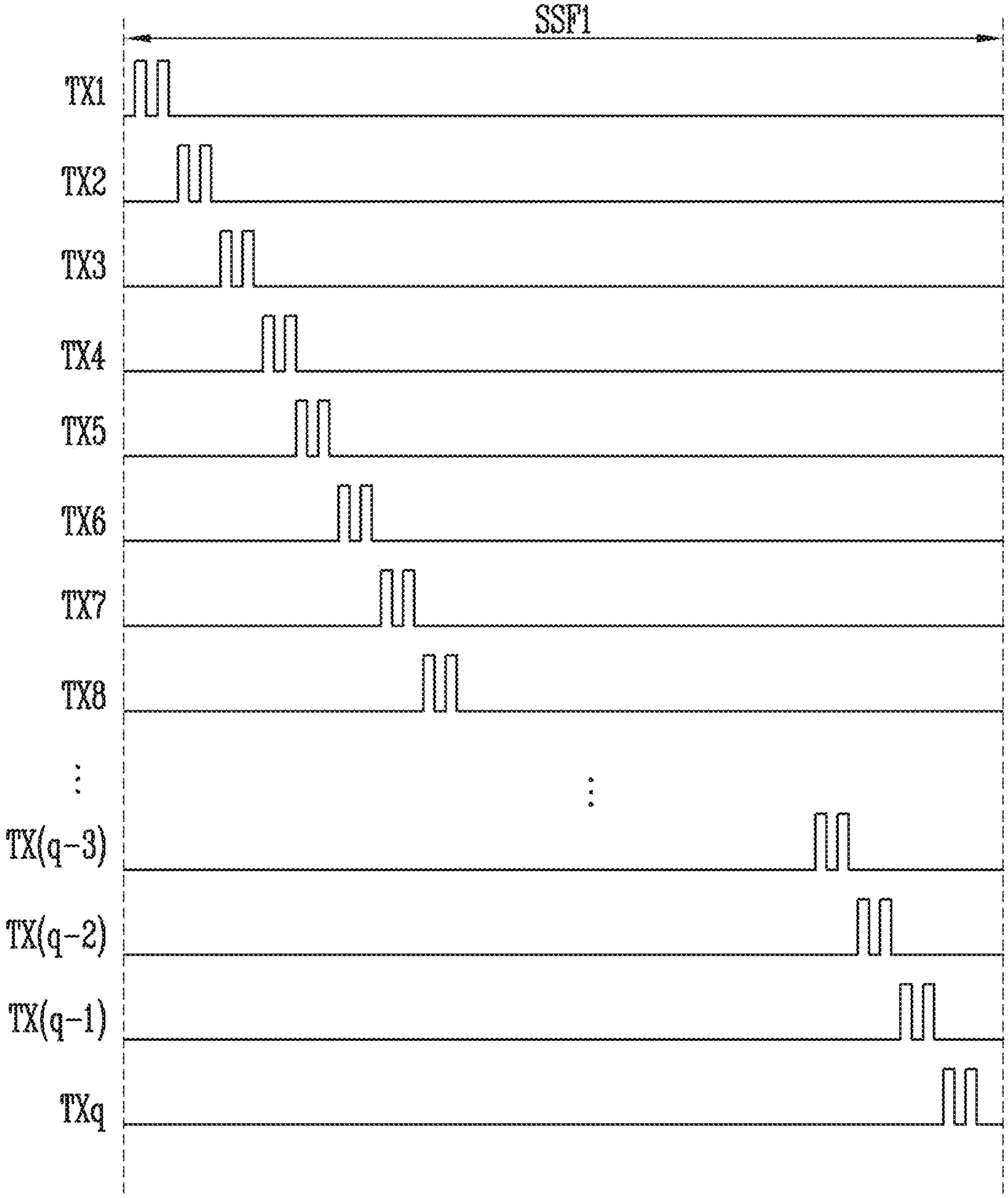
FIG. 7 is a diagram illustrating a method of driving a sensor device according to an embodiment of the disclosure.

FIG. 7 is a diagram illustrating a method of driving a sensor device according to an embodiment of the disclosure.

Referring to FIGS. 6 and 7, the driving signals applied to the first sensors TX1, TX2, TX3, TX4, TX5, TX6, TX7, TX8, . . . , and TX(q−3), TX(q−2), TX(q−1), and TXq during a first sensing frame period SSF1 are shown.

The sensor transmitter TDC may time-divisionally apply the driving signals to the first sensors TX1 to TXq. Timings at which the driving signals are applied to the respective first sensors TX1 to TXq may not overlap each other. For example, the sensor transmitter TDC may sequentially apply the driving signals to the first sensors TX1 to TXq. Each of the driving signals may be a voltage signal that alternates between a high level and a low level.

The sensor receiver TSC may receive the sensing signals through the second sensors RX1 to RXp for each driving signal. When a magnitude of a sensing signal detected by a specific second sensor is different from those of other sensing signals, it may be determined that the touch of the user occurs at an intersection of the first sensor to which the driving signal is applied and the second sensor to which the sensing signal is detected. For example, when the touch of the user occurs, a capacitance between the first sensor and the second sensor at the corresponding point may be reduced, and thus the magnitude of the sensing signal received from the second sensor may be reduced.

Figure 8:
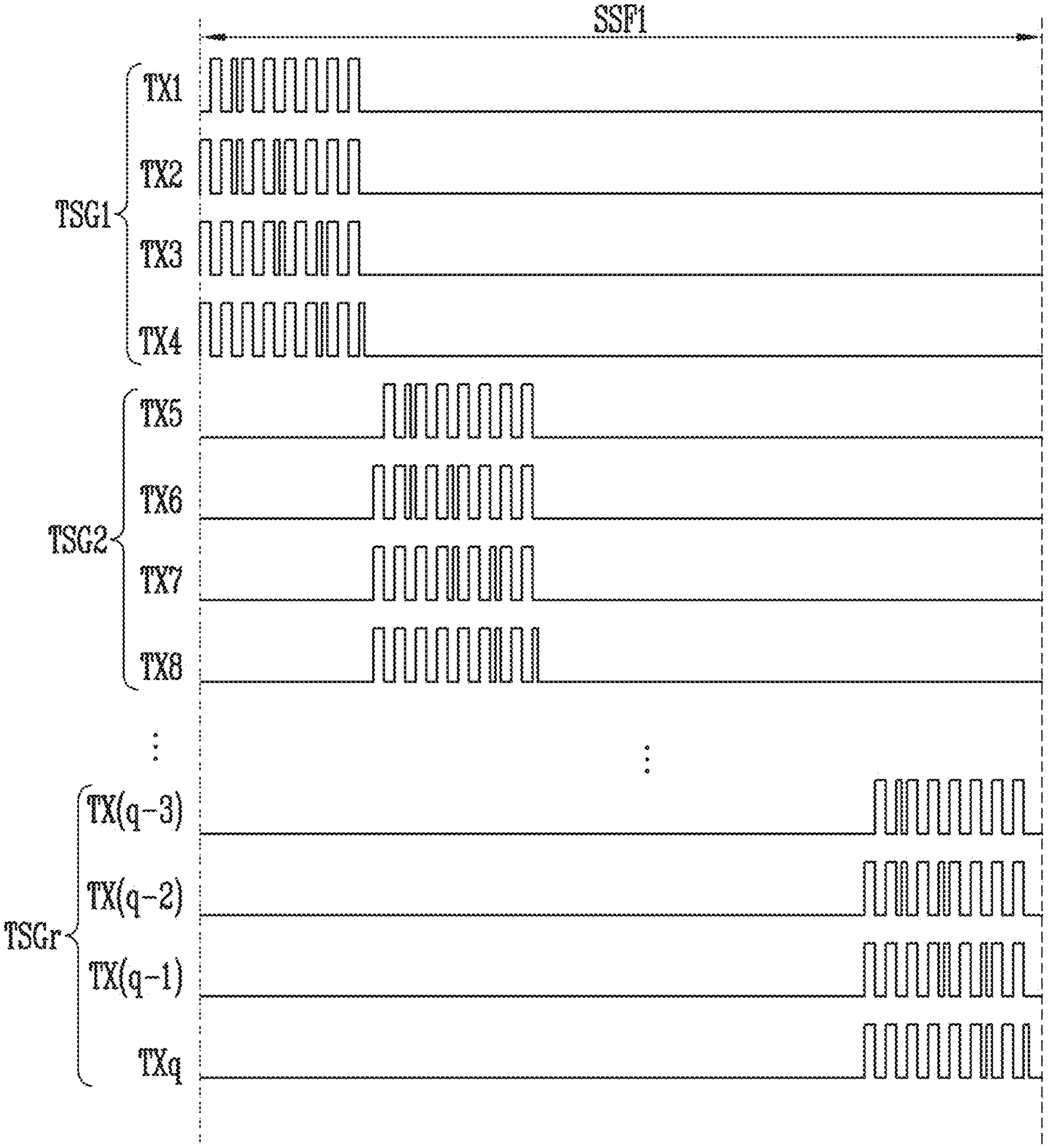
FIGS. 8 and 9 are diagrams illustrating a method of driving a sensor device according to an embodiment of the disclosure.
Figure 9:
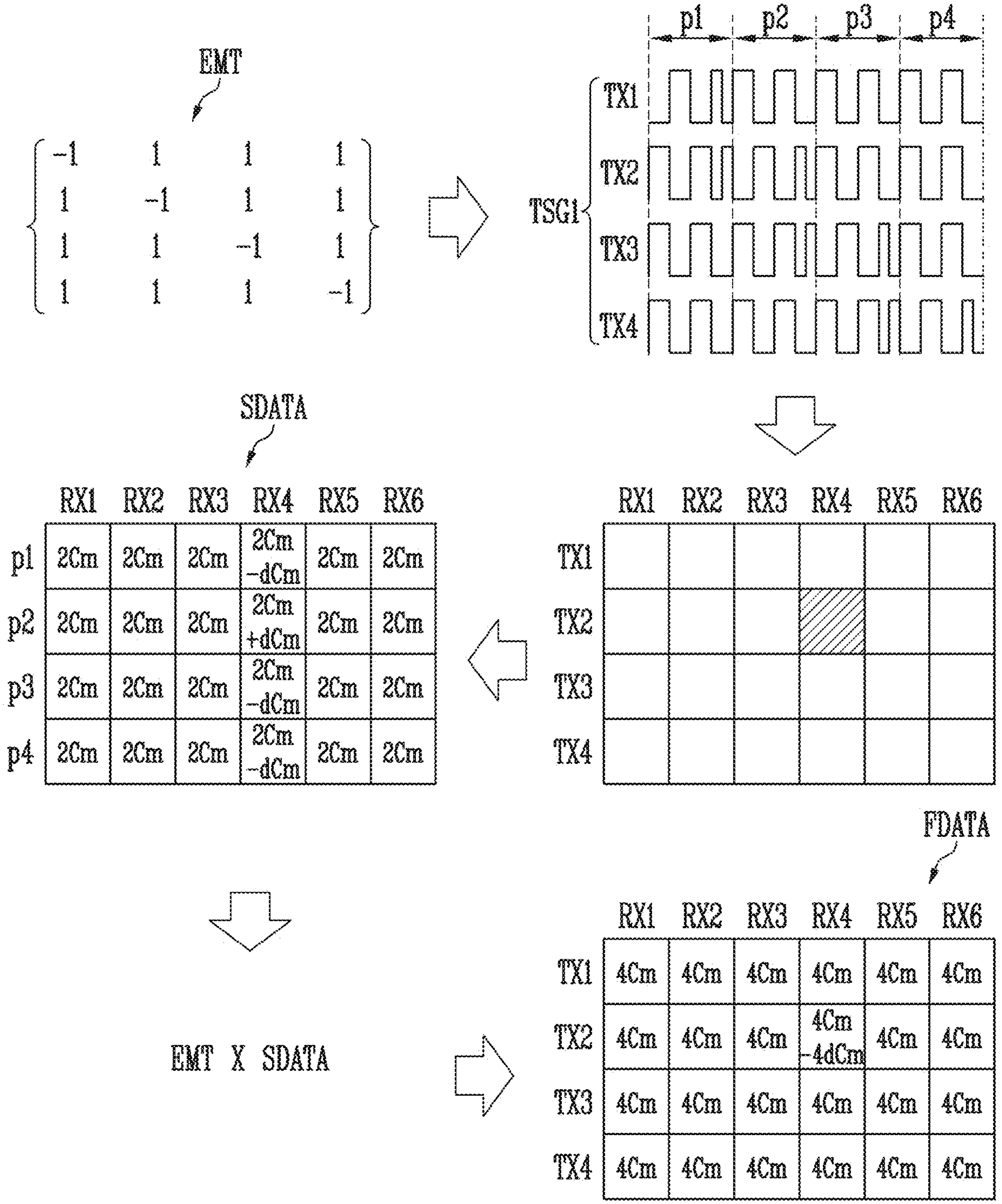

FIGS. 8 and 9 are diagrams illustrating a method of driving a sensor device according to an embodiment of the disclosure.

Referring to FIG. 8, the driving signals applied to the first sensors TX1, TX2, TX3, TX4, TX5, TX6, TX7, TX8, . . . , and TX(q−3), TX(q−2), TX(q−1), and TXq during the first sensing frame period SSF1 are shown.

The sensor unit 120 may include a plurality of sensor groups TSG1, TSG2, . . . , and TSGr. Each of the sensor groups TSG1, TSG2, . . . , and TSGr may include at least one of the first sensors TX1 to TXq. Each of the sensor groups TSG1, TSG2, . . . , and TSGr may include the same number of first sensors TX1 to TXq. The first sensors TX1 to TXq included in different sensor groups TSG1, TSG2, . . . , and TSGr may not overlap each other. For example, the first sensors TX1 to TXq may be grouped into the plurality of sensor groups TSG1 to TSGr.

The sensor transmitter TDC may time-divisionally apply the driving signals to the sensor groups TSG1, TSG2, . . . , and TSGr. Timings at which the driving signals are applied to the respective sensor groups TSG1, TSG2, . . . , and TSGr may not overlap each other. For example, the sensor transmitter TDC may sequentially apply the driving signals to the sensor groups TSG1, TSG2, . . . , and TSGr. Each of the driving signals may be a signal that alternates between a high level and a low level.

When the driving signals are applied to a specific sensor group among the sensor groups TSG1 to TSGr, waveforms of the driving signals applied to first sensors (e.g., four first sensors) included in the sensor group may be different from each other. For example, when the driving signals are applied to a first sensor group TSG1, waveforms of the driving signals applied to the first sensors TX1, TX2, TX3, and TX4 included in the first sensor group TSG1 may be different from each other. Referring to FIG. 9, the sensor transmitter TDC may generate the driving signals to correspond to an encoding matrix EMT and apply the driving signals to the first sensors TX1, TX2, TX3, and TX4. The encoding matrix EMT may define a waveform of driving signals for one sensor group TSG1. For example, rows of the encoding matrix EMT may indicate the first sensors TX1, TX2, TX3, and TX4, respectively, and columns may indicate driving signal application periods p1, p2, p3, and p4, respectively. A waveform of the driving signal of a case where an element of the encoding matrix EMT is −1 may have an inverted shape with respect to the waveform of the driving signal of a case where the element of the encoding matrix EMT is 1. For example, when the driving signal of the case where the element is 1 is a high level, the driving signal of the case where the element is −1 may be a low level. For example, a phase of the driving signal of the case where the element is 1 may be different by 180 degrees from a phase of the driving signal of the case where the element is −1.

The sensor receiver TSC may receive the sensing signals through the second sensors RX1 to RXp for each of the driving signals. Hereinafter, for convenience of description, only some RX1 to RX6 of the second sensors RX1 to RXp are described, but the same description may be applied to the other second sensors RX7 to RXp.

Referring to FIG. 9, for example, it is assumed that touch of the user occurs at an intersection of the first sensor TX2 and the second sensor RX4. It is assumed that a magnitude of a capacitance detected at an intersection of the first sensor and the second sensor where the touch of the user does not occur is 1 Cm. During a first period p1, a magnitude of the capacitance sensed through each of the second sensors RX1, RX2, RX3, RX5, and RX6 may be 2 Cm. For example, during the first period p1, a capacitance of 2 Cm obtained by summing a capacitance of −Cm through the driving signal of the first sensor TX1, a capacitance of +Cm through the driving signal of the first sensor TX2, a capacitance of +Cm through the drive signal of TX3, and a capacitance of +Cm through the drive signal of the first sensor TX4 may be detected through each of the second sensors RX1, RX2, RX3, RX5, and RX6.

On the other hand, during the first period p1, a magnitude of a capacitance sensed through the second sensor RX4 may be (2 Cm−dCm). For example, during the first period p1, a capacitance of (2 Cm−dCm) obtained by summing a capacitance of −Cm through the driving signal of the first sensor TX1, a capacitance of (+Cm−dCm) through the driving signal of the first sensor TX2, a capacitance of +Cm through the driving signal of the first sensor TX3, and a capacitance of +Cm through the driving signal of the first sensor TX4 may be detected through the second sensor RX4. "dCm" may be a capacitance generated by the user's touch.

During a second period p2, the magnitude of the capacitance sensed through each of the second sensors RX1, RX2, RX3, RX5, and RX6 may be 2 Cm. For example, during the second period p2, a capacitance of 2 Cm obtained by summing a capacitance of +Cm through the driving signal of the first sensor TX1, a capacitance of −Cm through the driving signal of the first sensor TX2, a capacitance of +Cm through the driving signal of the first sensor TX3, a capacitances of +Cm through the driving signal of the first sensor TX4 may be detected through each of the second sensors RX1, RX2, RX3, RX5, and RX6.

On the other hand, during the second period p2, the magnitude of the capacitance sensed through the second sensor RX4 may be (2 Cm+dCm). For example, during the second period p2, a capacitance of (2 Cm+dCm) obtained by summing a capacitance of +Cm through the driving signal of the first sensor TX1, a capacitance of −(Cm−dCm) through the driving signal of the first sensor TX2, a capacitance of +Cm through the driving signal of the first sensor TX3, and a capacitance of +Cm through the driving signal of the first sensor TX4 may be detected through the second sensor RX4.

Since capacitances detected in the third period p3 and the fourth period p4 are similar to that of the case of the first period p1, a repetitive description is omitted.

The sensor processor 226 of the sensor receiver TSC may generate final data FDATA through matrix multiplication of the encoding matrix EMT and sensing data SDATA. Referring to the final data FDATA, it may be confirmed that a capacitance of points where the touch of the user does not occur is detected as 4 Cm and a capacitance of points where the touch of the user occurs is detected as (4 Cm−4dCm). Accordingly, the sensor receiver TSC may detect that the touch of the user occurs at an intersection of the first sensor TX2 and the second sensor RX4.

Figure 10:
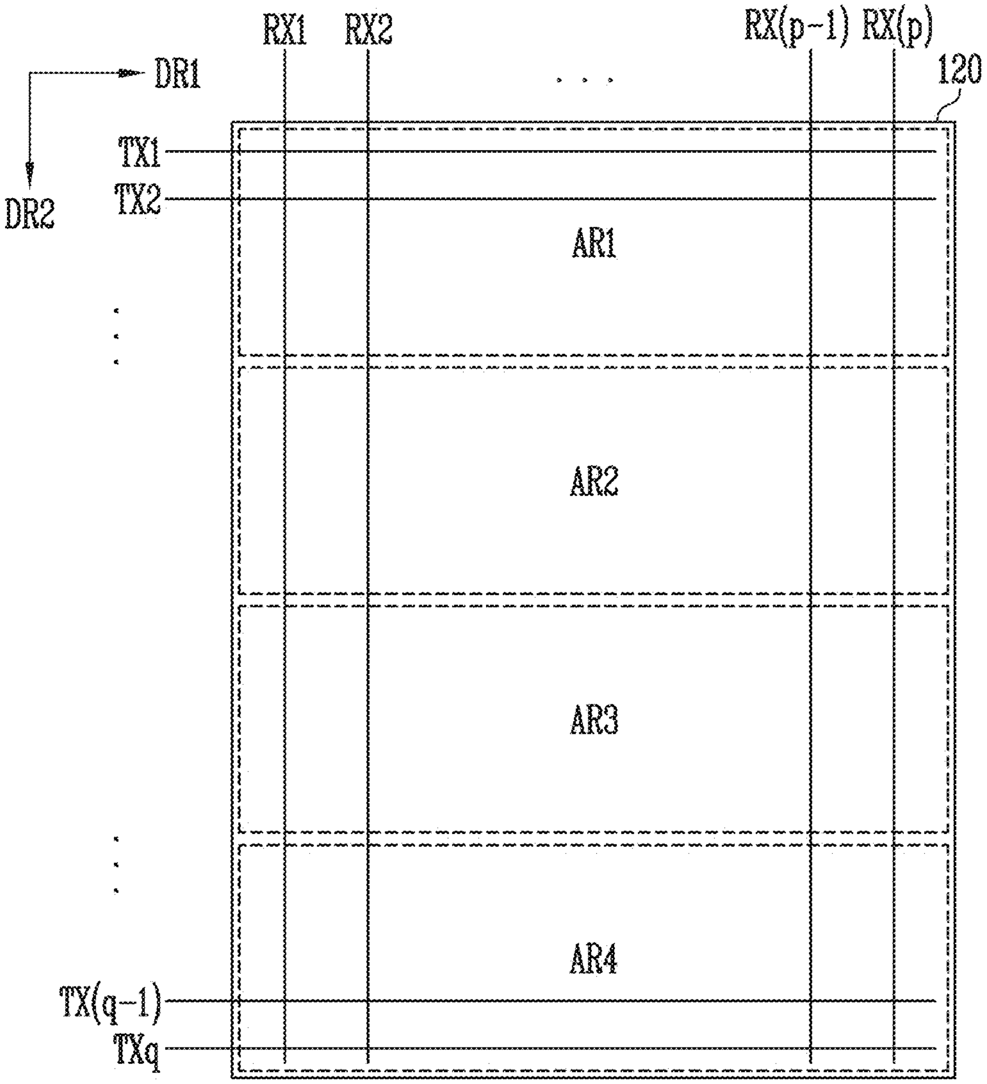
FIG. 10 is a diagram illustrating a sensor unit according to an embodiment of the disclosure.

FIG. 10 is a diagram illustrating a sensor unit according to an embodiment of the disclosure.

Referring to FIG. 10, the sensor unit 120 may include a plurality of sensing areas AR1, AR2, AR3, and AR4. A number of the plurality of sensing areas AR1 to AR4 may be an integer greater than 2. Hereinafter, for the convenience of description, it is assumed that the number of the plurality of sensing areas AR1 to AR4 is 4.

Each of the plurality of sensing areas AR1, AR2, AR3, and AR4 may include different first sensors TX1, TX2, . . . , TX(q−1), and TXq. The first sensors TX1 to TXq included in each of the sensing areas AR1, AR2, AR3, and AR4 may not overlap each other.

Each of the plurality of sensing areas AR1, AR2, AR3, and AR4 may include the same second sensors RX1, RX2, . . . , RX(p−1), and RXp. The second sensors RX1 to RXp may be shared by the sensing areas AR1, AR2, AR3, and AR4. For example, the second sensors RX1 to RXp may extend over the sensing areas AR1 to AR4.

FIG. 11 is a diagram illustrating a configuration of sensing frames according to an embodiment of the disclosure.

During the first sensing frame period SSF1 including A number of sensing periods SP1, SP2, SP3, and SP4, the sensor driver 220 may time-divisionally sense each of the A number of sensing areas AR1, AR2, AR3, and AR4 once. In an embodiment, a number of the sensing periods in the first sensing frame period SSF1 may be equal to a number of the sensing areas. In addition, during a second sensing frame period SSF2 including A number of sensing periods SP5, SP6, SP7, and SP8, the sensor driver 220 may time-divisionally sense each of the A number of sensing areas AR1, AR2, AR3, and AR4 once. In an embodiment, a number of the sensing periods in the second sensing frame period SSF2 may be equal to the number of the sensing areas. Similarly, the sensor driver 220 may time-divisionally sense each of the A number of sensing areas AR1, AR2, AR3, and AR4 once in each of other sensing frame periods . . . , SSF14, and SSF15. In an embodiment, a number of sensing periods of each sensing frame period may be equal to a number of sensing periods of other sensing frame periods.

In an embodiment, in each sensing frame period, each of the sensing areas may be randomly selected and sensed. For example, the sensing frame periods may have different orders of randomly sensing each of the sensing areas. In an embodiment, in two successive sensing frame periods, an initial sensing area to be sensed in an initial sensing period (i.e., an earliest sensing period) of the following sensing frame period of the two successive sensing frame periods may be different from a last sensing area which was sensed in a last sensing period of the preceding sensing frame period of the two successive sensing frame period. For example, it is assumed that the first sensing frame period SSF1 and the second sensing frame period SSF2 are two successive sensing frame periods. For the convenience of description, it is assumed that in the first sensing frame period SSF1 (i.e., the preceding sensing frame period of the two successive sensing frame periods), the sensing area AR2 may be randomly sensed during a last sensing period SP4 of the first sensing frame period SSF1. The sensor driver 220 may randomly set one of the other sensing areas AR1, AR3, and AR4 except for the sensing area AR2 which was sensed during the last sensing period SP4 of the first sensing frame period SSF1. For example, the sensor driver 220 may set the sensing area AR3 as an initial sensing area to be sensed during an initial sensing period SP5 of the second sensing frame period SSF2, which is different from the sensing area AR2 sensed during the last sensing period SP4 of the first sensing frame period SSF1. Once the initial sensing area (e.g., AR3) is set, the initial sensing area is selected and sensed during the initial sensing period (e.g., SP5), and the other sensing areas (e.g., AR1, AR2, and AR4) are randomly selected and sensed during the following sensing periods (e.g., SP6 to SP8) of the second sensing frame period SSF2.

According to the present embodiment, noise introduced from the sensor unit 120 to the display unit 110 may be dispersed by sensing a random sensing area in each of sensing periods SP1 to SP60. For example, an order in which the A number of sensing areas AR1 to AR4 are sensed during the first sensing frame period SSF1 may be different from an order in which the A number of sensing areas AR1 to AR4 are sensed during the second sensing frame period SSF2. Therefore, the driving signals may be applied with a random time difference rather than the same time difference with respect to the same sensing area, thereby reducing an abnormal display such as a stripe of the display unit 110.

Additionally, noise may be evenly dispersed by placing a certain limit on random selection of a sensing area. During a first sensing period SP1 of the first sensing frame period SSF1, the sensor driver 220 may select and sense one AR1 of the plurality of sensing areas AR1 to AR4 with a probability of 1/A. Here, it is assumed that a probability of 1 is a probability of 100%. Mark “O” of FIG. 11 means a selected sensing area.

Next, during a second sensing period SP2 of the first sensing frame period SSF1, the sensor driver 220 may select and sense one AR3 of (A−1) number of sensing areas AR2, AR3, and AR4 with a probability of 1/(A−1). At this time, the (A−1) number of sensing areas AR2, AR3, and AR4 may not include the sensing area AR1 sensed during the first sensing period SP1 of the first sensing frame period SSF1. Mark “X” of FIG. 11 means a sensing area which cannot be selected, since the sensing area was already sensed in a corresponding sensing frame period.

Next, during a third sensing period SP3 of the first sensing frame period SSF1, the sensor driver 220 may select and sense one AR4 of (A−2) number of sensing areas AR2 and AR4 with a probability of 1/(A−2). At this time, the (A−2) number of sensing areas AR2 and AR4 may not include the sensing areas AR1 and AR3 sensed during the first sensing period SP1 and the second sensing period SP2 of the first sensing frame period SSF1.

Next, during a fourth sensing period SP4 of the first sensing frame period SSF1, the sensor driver 220 may select and sense the sensing area AR2 with a probability of 1/(A−3). At this time, the (A−3) number of sensing area AR2 may not include the sensing areas AR1, AR3, and AR4 sensed during the first sensing period SP1, the second sensing period SP2, and the third sensing period SP3 of the first sensing frame period SSF1.

Next, during a first sensing period SP5 of the second sensing frame period SSF2, the sensor driver 220 may select and sense one AR3 of (A−1) number of sensing areas AR1, AR3, and AR4 with a probability of 1/(A−1). At this time, the (A−1) number of sensing areas AR1, AR3, and AR4 may not include the sensing area AR2 sensed during the last sensing period SP4 of the first sensing frame period SSF1.

Next, during a second sensing period SP6 of the second sensing frame period SSF2, the sensor driver 220 may select and sense one AR1 of (A−1) sensing areas AR1, AR2, and AR4 with a probability of 1/(A−1). At this time, the sensing area AR2 which was excluded in the first sensing period SP5 is included in the (A−1) number of sensing areas, and the (A−1) number of sensing areas AR1, AR2, and AR4 may not include the sensing area AR3 sensed during the first sensing period SP5 of the second sensing frame period SSF2.

Next, during a third sensing period SP7 of the second sensing frame period SSF2, the sensor driver 220 may select and sense one AR4 of A−2 number of sensing areas AR2 and AR4 with a probability of 1/(A−2). At this time, the A−2 number of sensing areas AR2 and AR4 may not include the sensing areas AR1 and AR3 sensed during the first sensing period SP5 and the second sensing period SP6 of the second sensing frame period SSF2.

Next, during a fourth sensing period SP8 of the second sensing frame period SSF2, the sensor driver 220 may select and sense (A−3) number of sensing area AR2 with a probability of 1/(A−3). At this time, the A−3 number of sensing area AR2 may not include the sensing areas AR1, AR3, and AR4 sensed during the first sensing period SP5, the second sensing period SP6, and the third sensing period SP7 of the second sensing frame period SSF2.

Similarly, the sensing areas AR1, AR2, AR3, and AR4 may be randomly sensed during subsequent sensing frame periods . . . , SSF14, and SSF15. It may be confirmed that each of the sensing areas AR1, AR2, AR3, and AR4 is equally sensed 15 times during 15 sensing frame periods, and thus noise may be evenly dispersed.

Figure 12:
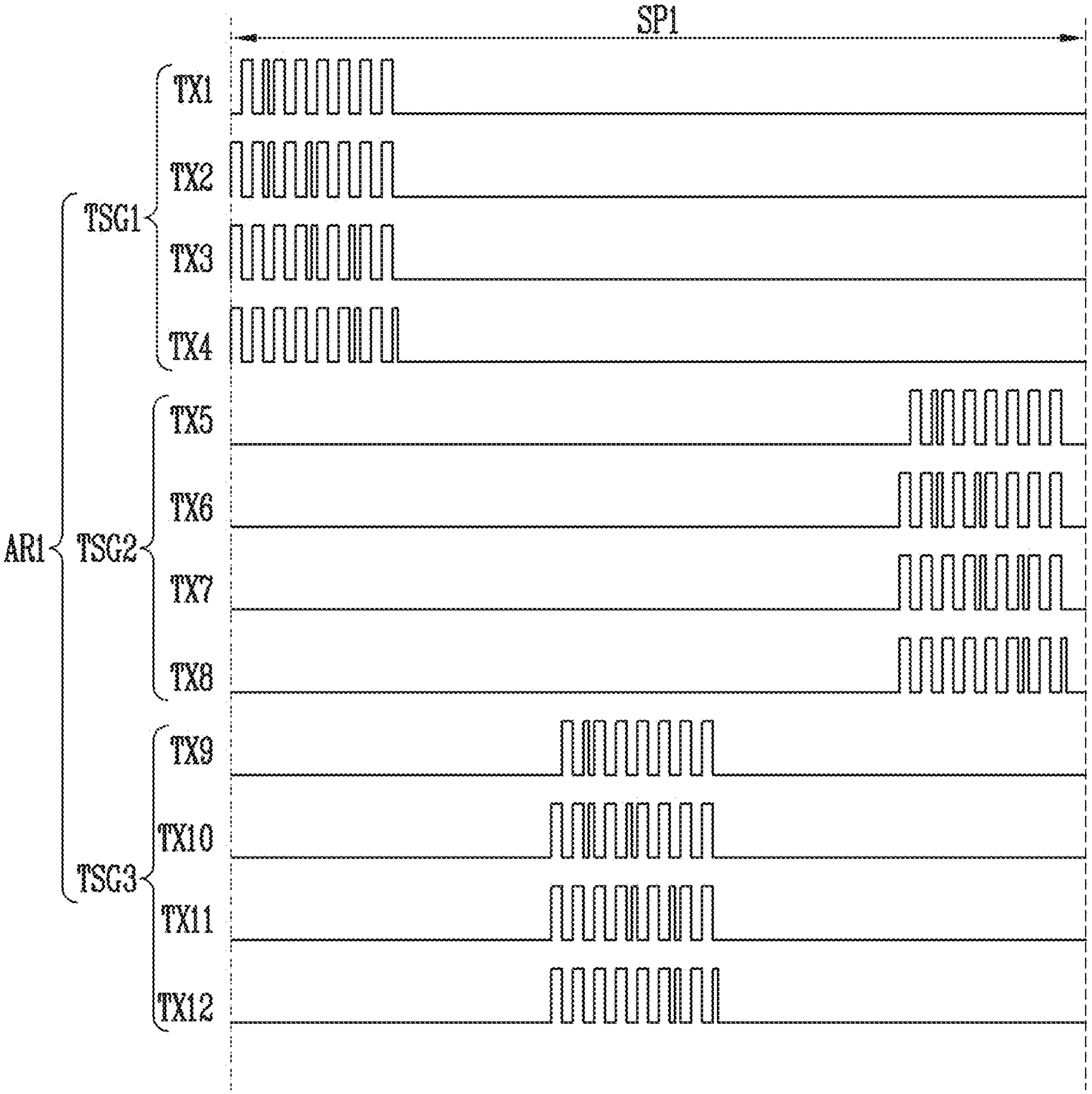
FIG. 12 is a diagram illustrating a configuration of a sensing period according to an embodiment of the disclosure.

FIG. 12 is a diagram illustrating a configuration of a sensing period according to an embodiment of the disclosure.

Referring to FIG. 12, a method of sensing the first sensing area AR1 by modifying the driving method of FIG. 8 in the first sensing period SP1 of the first sensing frame period SSF1 is shown as an example. It is assumed that the first sensing area AR1 includes first sensors TX1 to TX12.

According to an embodiment, the sensor driver 220 may randomly apply the driving signals to the sensor groups TSG1, TSG2, and TSG3. According to the present embodiment, noise may be more effectively dispersed.

FIGS. 13 to 19 are diagrams illustrating an exemplary configuration of the display device. Reference numerals of FIGS. 13 to 19 and reference numerals of FIGS. 1 to 12 are independent of each other.

Figure 13:
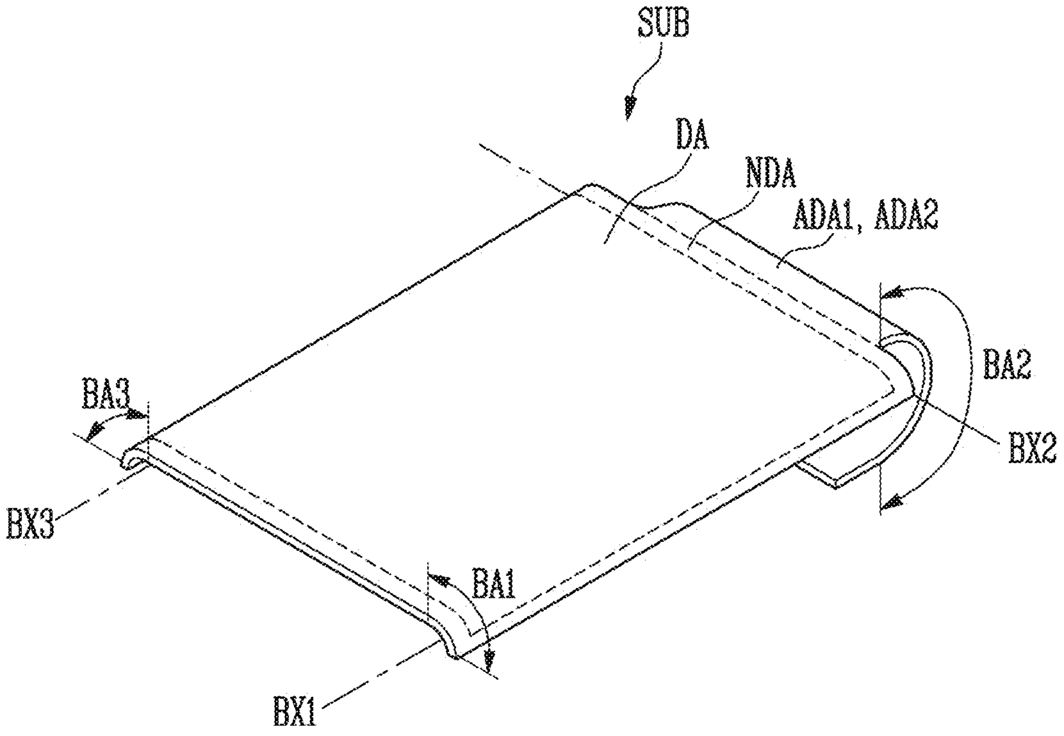
FIGS. 13 to 19 are diagrams illustrating an exemplary configuration of the display device according to an embodiment of the disclosure.

FIG. 13 is a diagram illustrating a substrate according to an embodiment of the disclosure, and FIG. 22 is a diagram illustrating a display device according to an embodiment of the disclosure.

In the following embodiments, a plane may define a position in a first direction DR1 and a second direction DR2, and a height may define a position in a third direction DR3 (refer to FIG. 15). The first direction DR1, the second direction DR2, and the third direction DR3 may be directions orthogonal to each other.

The substrate SUB may include a display area DA, a non-display area NDA, a first additional area ADA1, and a second additional area ADA2.

The display area DA may have a rectangular shape. Each corner of the display area DA may be an angular shape or a curved shape. The present invention is not limited thereto. For a circular display, the display area DA may have a circular shape. In an embodiment, the display area DA may be configured of a polygon other than a quadrangle and an ellipse. As described above, a shape of the display area DA may be set differently according to a product.

Pixels may be positioned on the display area DA. Each of the pixels may include a light emitting diode or may include a liquid crystal layer according to a type of a display device DP.

Figure 14:
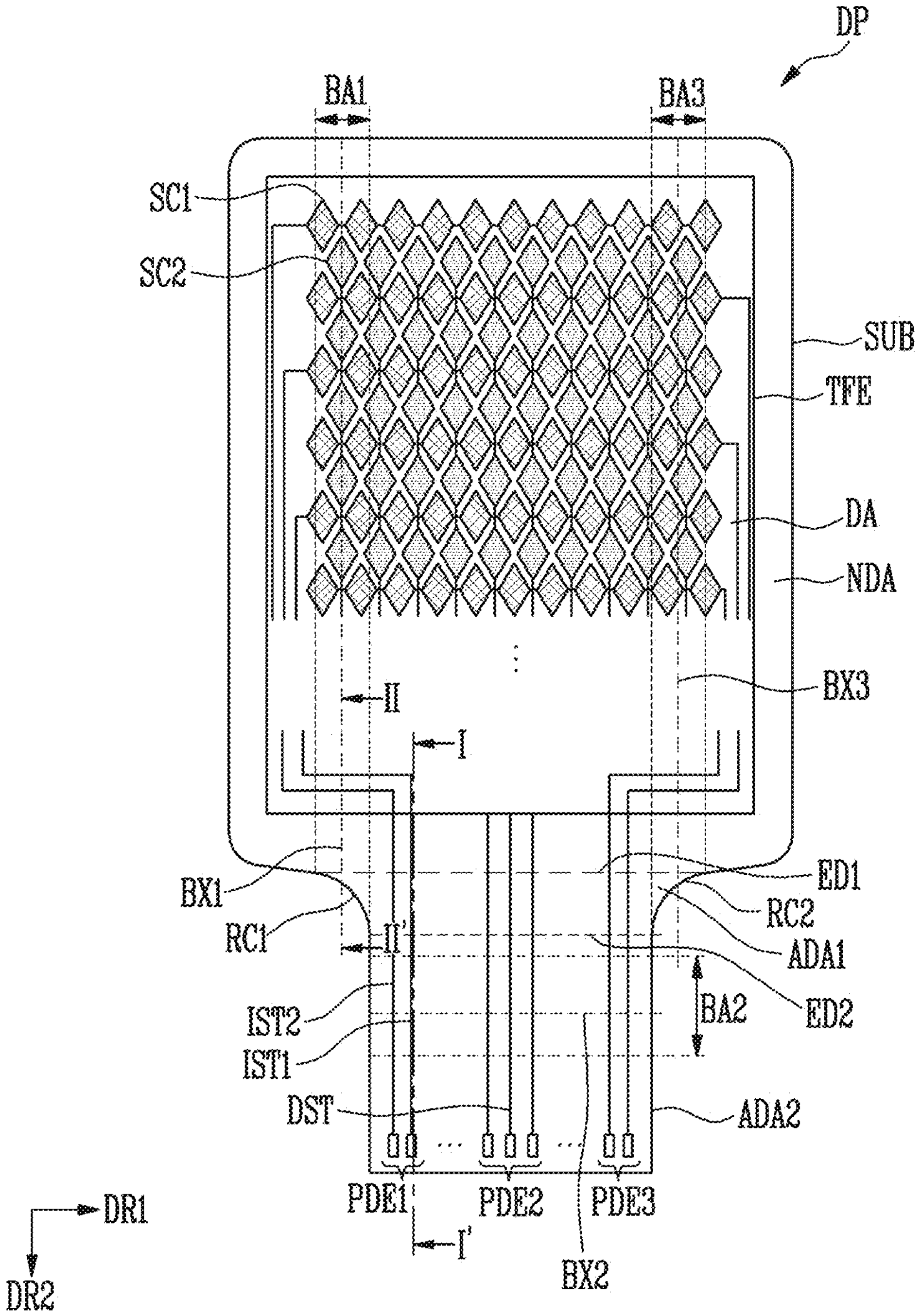

The non-display area NDA may surround an outer periphery of the display area DA. For example, the non-display area NDA may have a rectangular shape. Each corner of the non-display area NDA may be an angular shape or a curved shape. In FIG. 14, each corner of the non-display area NDA has a curved shape. The non-display area NDA may have a circular shape. Since minimizing the non-display area NDA is advantageous to a narrow bezel structure, a shape of the non-display area NDA may be similar to the shape of the display area DA.

The first additional area ADA1 may be positioned between the non-display area NDA and the second additional area ADA2. The first additional area ADA1 may be connected to the non-display area NDA at a first boundary ED1. The first additional area ADA1 may be connected to the second additional area ADA2 at a second boundary ED2. Each of the first boundary ED1 and the second boundary ED2 may extend in the first direction DR1.

The first additional area ADA1 may have a decreasing width from the first boundary ED1 toward the second boundary ED2. For example, the width of the first additional area ADA1 in the first direction DR1 may be narrower toward the second direction DR2. Therefore, the first additional area ADA1 may include a curved first side RC1 and a second side RC2. The sides RC1 and RC2 may be convex toward an inside of the substrate (for example, a center of the substrate).

FIG. 14 shows that the first additional area ADA1 includes the two sides RC1 and RC2 in the first direction DR1 and a direction opposite to the first direction DR1. In an embodiment, a boundary positioned in the first direction DR1 may coincide with a boundary of the non-display area NDA, and thus the first additional area ADA1 may include only the first side RC1. In an embodiment, a boundary positioned in the direction opposite to the first direction DR1 may coincide with the boundary of the non-display area NDA, and thus the first additional area ADA1 may include only the second side RC2.

The second additional area ADA2 may have a rectangular shape. Each corner positioned in the second direction DR2 of the second additional area ADA2 may be an angular shape or a curved shape. FIG. 14 shows that each corner positioned in the second direction DR2 of the second additional area ADA2 is an angular shape.

An encapsulation layer TFE may be positioned on the pixels. For example, the encapsulation layer TFE may cover the pixels in the display area DA and a boundary of the encapsulation layer TFE may be positioned in the non-display area NDA. The encapsulation layer TFE may cover light emitting elements and circuit elements of the pixels of the display area DA, thereby preventing breakage from external moisture or impact.

Sensing electrodes SC1 and SC2 may be positioned on the encapsulation layer TFE. The sensing electrodes SC1 and SC2 may sense an input such as touch, hovering, gesture, and proximity by a body portion (e.g., a finger or a hand) of a user. The sensing electrodes SC1 and SC2 may be configured in different shapes according to various methods such as a resistive type, a capacitive type, an electromagnetic type (EM), and an optical type. For example, when the sensing electrodes SC1 and SC2 are configured in the capacitive type, the sensing electrodes SC1 and SC2 may be driven in a mutual-capacitive type. The present invention, however, is not limited thereto. In an embodiment, a single electrode may be driven in a self-capacitive type. Hereinafter, for convenience of description, a case in which the sensing electrodes SC1 and SC2 are configured in a mutual-capacitive type is described as an example.

When the sensing electrodes SC1 and SC2 are driven in the mutual-capacitive type, the driving signal may be transmitted through a sensing line corresponding to the first sensing electrode SC1, and the sensing signal may be received through a sensing line corresponding to the second sensing electrode SC2 forming a mutual capacitance with the first sensing electrode SC1. When the body of the user is proximity, the mutual capacitance between the first sensing electrode SC1 and the second sensing electrode SC2 may be changed, and thus touch-or-not of the user may be detected in accordance with a difference of a touch signal according to the change of the mutual capacitance. In an embodiment, the driving signal may be transmitted through the sensing line corresponding to the second sensing electrode SC2, and the sensing signal may be received through the sensing line corresponding to the first sensing electrode SC1 forming a mutual capacitance with the second sensing electrode SC2.

Pads PDE1, PDE2, and PDE3 may be positioned on the second additional area ADA2. The pads PDE1 and PDE3 may be connected to the sensing electrodes SC1 and SC2 positioned above the encapsulation layer through the sensing lines IST1 and IST2. The pads PDE1 and PDE3 may be connected to an external touch integrated chip (IC). The pads PDE2 may be connected to the pixels positioned under the encapsulation layer TFE or a driver of the pixels through display lines DST. The driver may include a scan driver, an emission driver, or a data driver. The driver may be positioned under the encapsulation layer TFE or may be positioned in an external display IC connected through the pads PDE2.

When the display device DP is the mutual-capacitive type, a touch IC may transmit the driving signal through the first sensing line IST1 and receive the sensing signal through the second sensing line IST2. In an embodiment, the driving signal may be transmitted through the second sensing line IST2 and the sensing signal may be received through the first sensing line IST1. For reference, when the display device DP is the self-capacitive type, a driving method of the first sensing line IST1 and the second sensing line IST2 may be the same. The display lines DST may include a control line, a data line, or a power line. Through the display lines DST, power and/or signals are provided to the pixels to display an image. The signals may be provided from the driver connected to the display lines DL.

FIG. 13 shows a state in which the substrate SUB is bent, and FIG. 14 shows a state in which the substrate SUB is not bent. The display device DP may be bent as shown in FIG. 13 after elements are stacked on the substrate SUB in a state in which the display device DP is not bent as shown in FIG. 14.

The substrate SUB may include a first bending area BA1 extending from the first side RC1 of the first additional area ADA1 to overlap the non-display area NDA. The first bending area BA1 may be extended to overlap the display area DA. For example, each of the display area DA, the non-display area NDA, and the first additional area ADA1 may partially overlap the first bending area BA1. The first bending area BA1 may have a width of the first direction DR1 and a length extending in the second direction DR2. A first bending axis BX1 may be defined as a folding line extending in the second direction DR2 at a center of the first bending area BA1. According to an embodiment, the first bending area BA1 may be a portion where a stress is reduced due to removal of a portion of an insulating layer, compared to another portion around the first bending area BA1. According to an embodiment, the first bending area BA1 may have the same configuration as the other portion around first bending area BA1.

The substrate SUB may include a third bending area BA3 extending from the second side RC2 of the first additional area ADA1 to overlap the non-display area NDA. The third bending area BA3 may extend to overlap the display area DA. For example, each of the display area DA, the non-display area NDA, and the first additional area ADA1 may partially overlap the third bending area BA3. The third bending area BA3 may have a width of the first direction DR1 and a length extending in the second direction DR2. A third bending axis BX3 may be defined as a folding line extending in the second direction DR2 at a center of the third bending area BA3. According to an embodiment, the third bending area BA3 may be a portion where the stress is reduced by removal of a portion of the insulating layer, compared to another portion around the third bending area BA3. According to an embodiment, the third bending area BA3 may have the same configuration as the other portion around the third bending area BA3.

The second additional area ADA2 may include a second bending area BA2. The second bending area BA2 may have a width of the second direction DR2 and a length extending in the first direction DR1. A second bending axis BX2 may be defined as a folding line extending in the first direction DR1 at a center of the second bending area BA2. According to an embodiment, the second bending area BA2 may be a portion where the stress is reduced due to removal of a portion of the insulating layer or the like, compared to another portion around the second bending area BA2. According to an embodiment, the second bending area BA2 may have the same configuration as the other portion around the second bending area BA2.

The first to third bending areas BA1, BA2, and BA3 may not overlap with each other.

The term "folded" is intended to mean that a shape is not fixed and may be modified from its original shape to another shape, and may include being folded, curved, or rolled along one or more bending axes. A side bezel width of the first direction DR1 and the direction opposite to the first direction DR1 of the display device DP may be reduced by the first and third bending areas BA1 and BA3. A side bezel width of the second direction DR2 of the display device DP may be reduced by the second bending area BA2.

Figure 15:
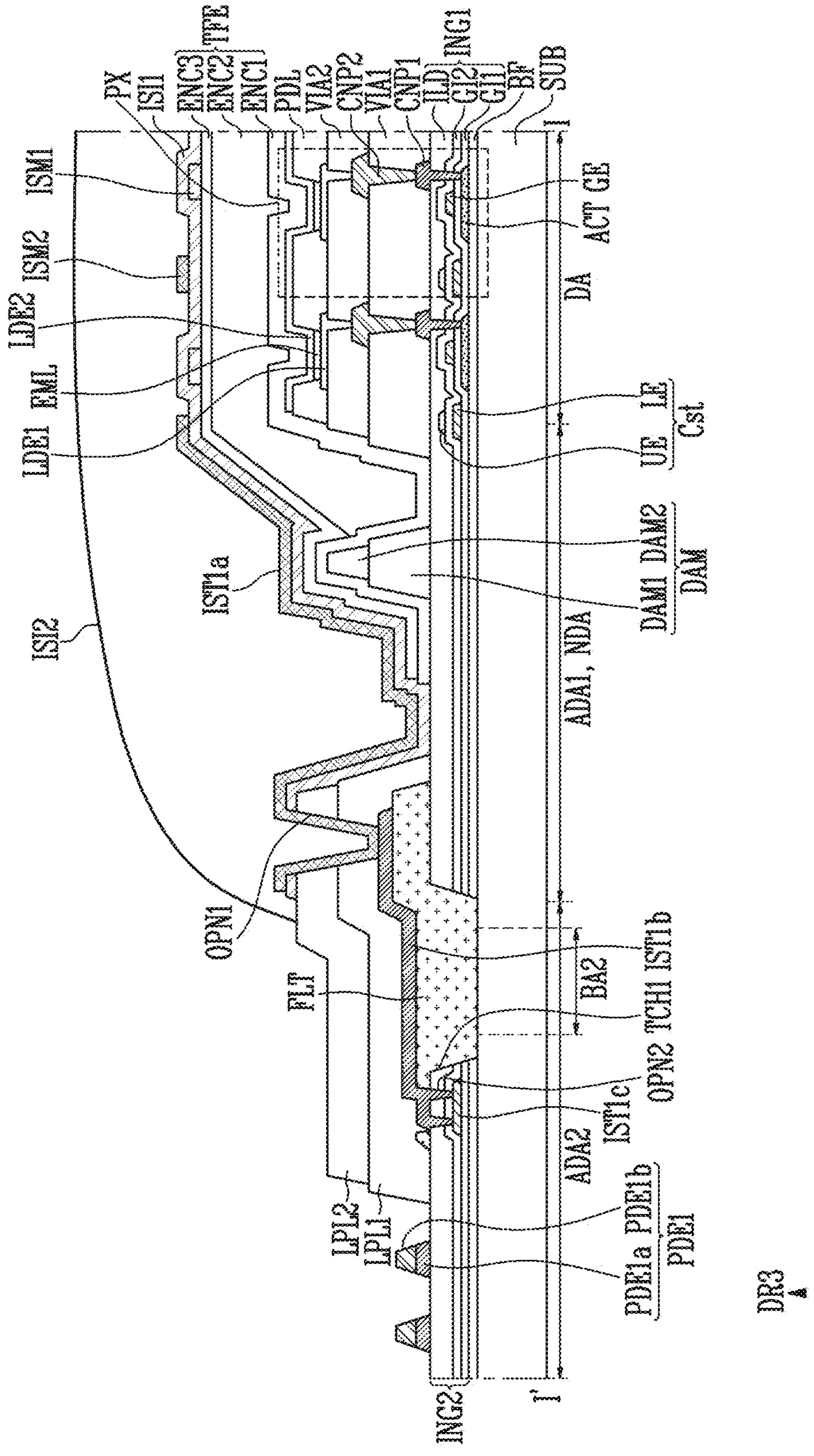

FIG. 15 is an embodiment of a cross-section taken along line I-I' of FIG. 14. For example, FIG. 15 shows a cross-sectional view taken along line I-I' of FIG. 14 passing through the first pad PDE1 and the first sensing line IST1.

First, the display area DA is described. In an embodiment of the disclosure, pixels PX are provided in the display area DA. Each pixel PX may include a transistor connected to a corresponding line of the display lines DST, a light emitting element connected to the transistor, and a capacitor Cst. In FIG. 15, for convenience of description, one transistor, one light emitting element, and one capacitor Cst are illustrated for one pixel PX as an example.

The substrate SUB may be formed of an insulating material such as glass and resin. The substrate SUB may be formed of a flexible material so that the substrate SUB can be bent or folded. The substrate SUB may have a single layer structure or a multiple layer structure.

For example, the substrate SUB may include or may be formed of at least one of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate. However, a material forming the substrate SUB may be variously changed. In an embodiment, the substrate SUB may include or may be formed of fiber reinforced plastic (FRP).

For example, when the substrate SUB has a multiple layer structure, inorganic materials such as silicon nitride, silicon oxide, and silicon oxynitride may be interposed between a plurality of layers in a single layer or a plurality of layers.

A buffer layer BF may cover the substrate SUB. The buffer layer BF may prevent an impurity from diffusing into a channel CH of the transistor. The buffer layer BF may be an inorganic insulating layer formed of an inorganic material. For example, the buffer layer BF may be formed of silicon nitride, silicon oxide, silicon oxynitride or the like, and may be omitted according to the material of the substrate SUB and a process condition. According to an embodiment, a barrier layer may be further provided.

An active layer ACT may be positioned on the buffer layer BF. The active layer ACT may be patterned to configure the channel, a source electrode, and a drain electrode of the transistor, or configure a line. The active layer ACT may be formed of a semiconductor material. The active layer ACT may be a semiconductor pattern formed of polysilicon, amorphous silicon, or an oxide semiconductor. The channel of the transistor may be a semiconductor pattern which is not doped with an impurity, and may be an intrinsic semiconductor. The source electrode, the drain electrode, and the line may be a semiconductor pattern doped with an impurity. As the impurity, an impurity such as an n-type impurity, a p-type impurity, and other metals may be used.

A first gate insulating layer GI1 may cover the active layer ACT. The first gate insulating layer GI1 may be an inorganic insulating layer formed of an inorganic material. As the inorganic material, an inorganic insulating material such as polysiloxane, silicon nitride, silicon oxide, and silicon oxynitride may be used.

A gate electrode GE of the transistor and a lower electrode LE of the capacitor Cst may be positioned on the first gate insulating layer GI1. For example, the first gate insulating layer GI1 may be interposed between the gate electrode GE and the active layer ACT. The gate electrode GE may overlap an area corresponding to the channel CH.

The gate electrode GE and the lower electrode LE may be formed of metal. For example, the gate electrode GE may be formed of at least one of a metal such as gold (Au), silver (Ag), aluminum (Al), molybdenum (Mo), chromium (Cr), titanium (Ti), nickel (Ni), neodymium, or copper (Cu), and an alloy of thereof. The gate electrode GE may be formed of a single layer, but is not limited thereto. In an embodiment, the gate electrode GE may be formed of multiple layers in which two or more metal or metal alloy layers are stacked.

A second gate insulating layer GI2 may cover the gate electrode GE and the lower electrode LE. The second gate insulating layer GI2 may be an inorganic insulating layer formed of an inorganic material. The inorganic material may include polysiloxane, silicon nitride, silicon oxide, or silicon oxynitride.

An upper electrode UE of the capacitor Cst may be positioned on the second gate insulating layer GI2. The upper electrode UE of the capacitor Cst may be formed of metal. For example, the upper electrode UE may be formed of at least one of gold (Au), silver (Ag), aluminum (Al), molybdenum (Mo), chromium (Cr), titanium (Ti), nickel (Ni), neodymium, copper (Cu), and an alloy of thereof. The upper electrode UE may be formed of a single layer, but is not limited thereto. In an embodiment, the upper electrode UE may be formed of multiple layers in which two or more metal or metal alloy layers are stacked.

The lower electrode LE and the upper electrode UE may configure the capacitor Cst with the second gate insulating layer GI2 interposed therebetween. In FIG. 23, the capacitor Cst is shown as a two layer electrode structure of the lower electrode LE and the upper electrode UE. However, the present invention is not limited thereto. In embodiment, the capacitor Cst may be configured as a three layer electrode structure using the active layer ACT, a three layer electrode structure using an electrode of the same layer as a first connection pattern CNP1, or an electrode structure of four or more layers.

An interlayer insulating layer ILD may cover the upper electrode UE. The interlayer insulating layer ILD may be an inorganic insulating layer formed of an inorganic material. The inorganic material may include polysiloxane, silicon nitride, silicon oxide, or silicon oxynitride.

In the present embodiment, for convenience of description, the first gate insulating layer GI1, the second gate insulating layer GI2, and the interlayer insulating layer ILD may be referred to as a first insulating layer group ING1. The first insulating layer group ING1 may cover a portion of the transistor. According to an embodiment, the first insulating layer group ING1 may further include the buffer layer BF.

The first connection pattern CNP1 may be positioned on the interlayer insulating layer ILD. The first connection pattern CNP1 may be in contact with each of the source electrode and the drain electrode of the active layer ACT through a contact hole penetrating the interlayer insulating layer ILD, the second gate insulating layer GI2, and the first gate insulating layer GI1.

The first connection pattern CNP1 may be formed of metal. For example, the source electrode SE and the drain electrode DE may be formed of at least one of gold (Au), silver (Ag), aluminum (Al), molybdenum (Mo), chromium (Cr), titanium (Ti), nickel (Ni), neodymium, copper (Cu), and an alloy thereof.

Although not shown, according to an embodiment, a passivation layer may cover the first connection pattern CNP1. The passivation layer may be an inorganic insulating layer formed of an inorganic material. The inorganic material may include polysiloxane, silicon nitride, silicon oxide, or silicon oxynitride.

A first via layer VIA1 may cover the passivation layer or the transistor. The first via layer VIA1 may be an organic insulating layer formed of an organic material. The organic material may include an organic insulating material such as a polyacrylic compound, a polyimide compound, a fluorocarbon compound such as Teflon, and a benzocyclobutene compound. The organic layer may be deposited by a method such as evaporation.

The second connection pattern CNP2 may be connected to the first connection pattern CNP1 through an opening of the first via layer VIA1. The second connection pattern CNP2 may be formed of metal such as gold (Au), silver (Ag), aluminum (Al), molybdenum (Mo), chromium (Cr), titanium (Ti), nickel (Ni), neodymium, copper (Cu), and an alloy thereof.

The second via layer VIA2 may cover the first via layer VIA1 and the second connection pattern CNP2. The second via layer VIA2 may be an organic insulating layer formed of an organic material. The organic material may include an organic insulating material such as a polyacrylic compound, a polyimide compound, a fluorocarbon compound such as Teflon, or a benzocyclobutene compound.

A first light emitting element electrode LDE1 may be connected to the second connection pattern CNP2 through an opening of the second via layer VIA2. The first light emitting element electrode LDE1 may be an anode of the light emitting element according to an embodiment.

According to an embodiment, a configuration of the second via layer VIA2 and the second connection pattern CNP2 may be omitted and the first light emitting element electrode LDE1 may be directly connected to a first contact electrode through the opening of the first via layer VIA1.

The first light emitting element electrode LDE1 may include or may be formed of metal such as Ag, Mg, Al, Pt, Pd, Au, Ni, Nd, Ir, Cr, and an alloy thereof, indium tin oxide (ITO), indium zinc oxide (IZO), zinc oxide (ZnO), or indium tin zinc oxide (ITZO). The first light emitting element electrode LDE1 may be formed of one type of metal, but is not limited thereto, and may be formed of two or more types of metal, for example, an alloy of Ag and Mg.

The first light emitting element electrode LDE1 may be formed of a transparent conductive layer when an image is to be provided in a downward direction of the substrate SUB, and the first light emitting element electrode LDE1 may be formed of a metal reflective layer and/or a transparent conductive layer when an image is to be provided in an upward direction of the substrate SUB.

A pixel defining layer PDL for partitioning an emission area of each pixel PX is provided on the substrate SUB on which the first light emitting element electrode LDE1 is formed. The pixel defining layer PDL may be an organic insulating layer formed of an organic material. The organic material may include an organic insulating material such as a polyacrylic compound, a polyimide compound, a fluorocarbon compound such as Teflon, or a benzocyclobutene compound.

The pixel defining layer PDL may expose an upper surface of the first light emitting element electrode LDE1 and may protrude from the substrate SUB along a periphery of the pixel PX. A light emitting layer EML may be provided in an area of the pixel PX surrounded by the pixel defining layer PDL.

The light emitting layer EML may include a low molecular material (i.e., a low molecular weight material) or a high molecular material (i.e., a high molecular weight material). Examples of the low molecular material may include copper phthalocyanine (CuPc), N,N-di (naphthalen-1-yl)-N, N'-diphenyl-be nzidine (N,N'-Di (naphthalene-1-yl)-N, N'-diphenyl-benzidine (NPB), or tris-8-hydroxyquinoline aluminum (Alq3). These materials may be formed by a vacuum deposition method. Examples of the high molecular material may include PEDOT, poly-phenylenevinylene (PPV), or polyfluorene.

The light emitting layer EML may be provided as a single layer, but may be provided as multiple layers including various functional layers. When the light emitting layer EML is provided as the multiple layers, the light emitting layer EML may have a structure in which a hole injection layer (HIL), a hole transport layer (HTL), an emission layer (EML), an electron transport layer (ETL), or an electron injection layer (EIL) are stacked in a single or composite structure. The light emitting layer EML may be formed by a screen printing method, an inkjet printing method, or a laser induced thermal imaging (LITI) method.

According to an embodiment, at least a portion of the light emitting layer EML may be integrally formed over a plurality of first light emitting element electrodes LDE1, and may also be individually provided to correspond to the plurality of first light emitting element electrodes LDE1, respectively.

A second light emitting element electrode LDE2 may be provided on the light emitting layer EML. The second light emitting element electrode LDE2 may be provided for each pixel PX, but may be provided to cover most of the display area DA and may be shared by the plurality of pixels PX.

The second light emitting element electrode LDE2 may be used as a cathode or an anode according to an embodiment. When the first light emitting element electrode LDE1 is the anode, the second light emitting element electrode LDE2 may be used as the cathode. When the first light emitting element electrode LDE1 is the cathode, the second light emitting element electrode LDE2 may be used as the anode.

The second light emitting element electrode LDE2 may be formed of metal such as Ag, Mg, Al, Pt, Pd, Au, Ni, Nd, Ir, and Cr, and/or a transparent conductive layer such as indium tin oxide (ITO), indium zinc oxide (IZO), zinc oxide (ZnO), and indium tin zinc oxide (ITZO). In an embodiment of the disclosure, the second light emitting element electrode LDE2 may be formed of multiple layers of two or more layers including a metal thin film, and for example, the second light emitting element electrode LDE2 may be formed of triple layers of ITO/Ag/ITO.

The second light emitting element electrode LDE2 may be formed of a metal reflective layer and/or a transparent conductive layer when an image is to be provided in a downward direction of the substrate SUB, and the second light emitting element electrode LDE2 may be formed of a transparent conductive layer when an image is to be provided in an upward direction of the substrate SUB.

A set of the first light emitting element electrode LDE1, the light emitting layer EML, and the second light emitting element electrode LDE2 may be referred to as a light emitting element.

The encapsulation layer TFE may be provided on the second light emitting element electrode LDE2. The encapsulation layer TFE may be formed of a single layer, but may also be formed of multiple layers. In the present embodiment, the encapsulation layer TFE may be formed of first to third encapsulation layers ENC1, ENC2, and ENC3. The first to third encapsulation layers ENC1, ENC2 and ENC3 may be formed of an organic material and/or an inorganic material. The third encapsulation layer ENC3 positioned at an outermost periphery of the first to third encapsulation layers ENC1 to ENC3 (or an uppermost layer of the first to third encapsulation layers ENC1 to ENC3) may be formed of an inorganic material. For example, the first encapsulation layer ENC1 may be an inorganic layer formed of an inorganic material, the second encapsulation layer ENC2 may be an organic layer formed of an organic material, and the third encapsulation layer ENC3 may be an inorganic layer formed of an inorganic material. Penetration of moisture or oxygen to the inorganic material is less than that of the organic material. However, since elasticity or flexibility of the inorganic material is low, the inorganic material is vulnerable to a crack. Propagation of a crack may be prevented by forming the first encapsulation layer ENC1 and the third encapsulation layer ENC3 with the inorganic material and forming the second encapsulation layer ENC2 with the organic material. Here, a layer formed of the organic material, that is, the second encapsulation layer ENC2, may be completely covered by the third encapsulation layer ENC3 so that an end of the second encapsulation layer ENC2 is not exposed to the outside. The organic material may include an organic insulating material such as a polyacrylic compound, a polyimide compound, a fluorocarbon compound such as Teflon, or a benzocyclobutene compound. The inorganic material may include polysiloxane, silicon nitride, silicon oxide, or silicon oxynitride.

The light emitting layer EML forming the light emitting element may be easily damaged by moisture or oxygen from the outside. The encapsulation layer TFE protects the light emitting elements by covering the light emitting layer EML. The encapsulation layer TFE may cover the display area DA and may extend to the non-display area NDA outside the display area DA. Insulating layers formed of an organic material may be flexible or elastic, but moisture and oxygen may easily penetrate as compared to an insulating layer formed of an inorganic material. To prevent penetration of moisture or oxygen through insulating layers formed of an organic material, the end of the insulating layers formed of the organic material may be covered by insulating layers formed of an inorganic material so that the end of the organic insulating layers is not exposed to the outside. For example, the first via layer VIA1, the second via layer VIA2, and the pixel defining layer PDL, which are formed of an organic material, do not extend continuously to the non-display area NDA, and may be covered by the first encapsulation layer ENC1. Therefore, the encapsulation layer TFE including the inorganic material may seal an upper surface of the pixel defining layer PDL and sides of the first via layer VIA1, the second via layer VIA2, and the pixel defining layer PDL to prevent exposure thereof to the outside.

However, whether the encapsulation layer TFE is formed of a plurality of layers or a material of the encapsulation layer TFE is not limited thereto, and may be variously changed. For example, the encapsulation layer TFE may include a plurality of organic material layers and a plurality of inorganic material layers which are alternately stacked.

A first sensing electrode layer ISM1 may be positioned on the encapsulation layer TFE. According to an embodiment, an additional buffer layer may be positioned between the first sensing electrode layer ISM1 and the encapsulation layer TFE. The first sensing electrode layer ISM1 may be formed of a metal layer such as Ag, Mg, Al, Pt, Pd, Au, Ni, Nd, Ir or Cr, and/or a transparent conductive layer such as indium tin oxide (ITO), indium zinc oxide (IZO), zinc oxide (ZnO), or indium tin zinc oxide (ITZO).

The first sensing insulating layer ISI1 may exist on the first sensing electrode layer ISM1. The first sensing insulating layer ISI1 may be an inorganic insulating layer formed of an inorganic material. As the inorganic material, an inorganic insulating material such as polysiloxane, silicon nitride, silicon oxide, silicon oxynitride, and the like may be used.

A second sensing electrode layer ISM2 may be present on the first sensing insulating layer ISI1. The second sensing electrode layer ISM2 may be formed of a metal layer such as Ag, Mg, Al, Pt, Pd, Au, Ni, Nd, Ir or Cr, and/or a transparent conductive layer such as indium tin oxide (ITO), indium zinc oxide (IZO), zinc oxide (ZnO), or indium tin zinc oxide (ITZO).

A configuration of various input sensors using the first sensing electrode layer ISM1, the first sensing insulating layer ISI1, and the second sensing electrode layer ISM2 is described later with reference to FIGS. 17 to 19.

In the embodiment of FIG. 15, the second sensing electrode layer ISM2 may be patterned to configure a first pattern IST1*a* of the first sensing line IST1.

The second sensing insulating layer ISI2 may be positioned on the second sensing electrode layer ISM2. The second sensing insulating layer ISI2 may be configured of an organic layer. For example, as the organic material, an organic insulating material such as a polyacrylic compound, a polyimide compound, a fluorocarbon compound such as Teflon, or a benzocyclobutene compound may be used. For example, the second sensing insulating layer ISI2 may be formed of polymethyl methacrylate, polydimethylsiloxane, polyimide, acrylate, polyethylene terephthalate, polyethylene naphthalate, or the like.

Next, the non-display area NDA, the first additional area ADA1, and the second additional area ADA2 are described. Since distinction between the non-display area NDA and the first additional area ADA1 is not a characteristic in the cross-sectional view of FIG. 15, the non-display area NDA and the first additional area ADA1 are not separately described. Hereinafter, in describing the non-display area NDA and the second additional area ADA2, a previously described content is omitted or briefly described in order to avoid repetition of description.

A dam DAM may be positioned at a boundary of the second encapsulation layer ENC2. For example, the dam DAM may be positioned between a planarization layer FLT and the second encapsulation layer ENC2. The dam DAM may be a multiple layer structure and may include, for example, a first dam DAM1 and a second dam DAM2. For example, the first and second dams DAM1 and DAM2 may be formed of an organic material. Each of the first and second dams DAM1 and DAM2 may correspond to any one of the first via layer VIA1, the second via layer VIA2, and the pixel defining layer PDL. For example, when the first dam DAM1 is formed of the same material through the same process as the first via layer VIA1, the second dam DAM2 may be formed of the same material through the same process as the second via layer VIA2 or the pixel defining layer PDL. In another example, when the first dam DAM1 is formed of the same material through the same process as the second via layer VIA2, the second dam DAM2 may be formed of the same material through the same process as the pixel defining layer PDL. In addition, when a spacer is formed on the pixel defining layer PDL of the display area DA, the dam DAM may also be formed using the same material as the spacer.

The dam DAM prevents the organic material of the second encapsulation layer ENC2 of which fluidity is strong from overflowing to the outside of the dam DAM during a process. The first and third encapsulation layers ENC1 and ENC3 formed of the inorganic material may cover the dam DAM and extend, and thus adhesion to the substrate SUB or other layers on the substrate SUB may be increased.

The first pad PDE1 may be positioned on the substrate SUB, and may be spaced apart from the planarization layer FLT. The first pad PDE1 may be supported by a second insulating layer group ING2. Insulating layers of the second insulating layer group ING2 may correspond to insulating layers of the first insulating layer group ING1, respectively. The first pad PDE1 may include a first pad electrode PDE1*a* and a second pad electrode PDE1*b*. The first pad electrode PDE1*a* may be formed of the same material as the first connection pattern CNP1. The second pad electrode PDE1*b* may be formed of the same material as the second connection pattern CNP2.

The planarization layer FLT may be positioned on the substrate SUB, and may be spaced apart from an area covered by the encapsulation layer TFE. The planarization layer FLT may be an organic insulating layer formed of an organic material. As the organic material, an organic insulating material such as a polyacrylic compound, a polyimide compound, a fluorocarbon compound such as Teflon, a benzocyclobutene compound, or the like may be used.

In the present embodiment, the planarization layer FLT may be formed before the formation of the first connection pattern CNP1 after the formation of the interlayer insulating layer ILD. Therefore, the planarization layer FLT and the first via layer VIA1 may be formed through different processes. According to an embodiment, the planarization layer FLT and the first via layer VIA1 may include different organic materials.

One end of the planarization layer FLT may cover the first insulating layer group ING1. In addition, a portion of the planarization layer FLT corresponding to the second bending area BA2 may fill a first trench TCH1 between the first insulating layer group ING1 and the second insulating layer group ING2.

Since the inorganic insulating layers have rigidness higher and flexibility lower than those of the organic insulating layer, a probability of occurrence of a crack is relatively high. When the crack occurs in the inorganic insulating layers, the crack may propagate to lines on the inorganic insulating layers, and finally, a defect such as line disconnection or the like may be generated.

Therefore, as shown in FIG. 15, the first trench TCH1 may be formed by removing the inorganic insulating layers from the second bending area BA2, and the first insulating layer group ING1 and the second insulating layer group ING2 may be distinguished. In the present embodiment, all of the inorganic insulating layers corresponding to an area of the first trench TCH1 are removed, but in another embodiment, some inorganic insulating layers may remain. In this case, the remaining some inorganic insulating layers may include a slit to disperse a bending stress.

A second pattern IST1*b* of the first sensing line IST1 may extend on the planarization layer FLT and may be electrically connected to the first pad PDE1. In the present embodiment, the second pattern IST1*b* may be formed of the same material through the same process as the first connection pattern CNP1.

A first line protective layer LPL1 may cover the planarization layer FLT and the second pattern IST1*b*. In addition, a second line protective layer LPL2 may cover the first line protective layer LPL1. According to an embodiment, a configuration of the second line protective layer LPL2 may be omitted. The first and second line protective layers LPL1 and LPL2 may be formed of an organic material. Each of the first and second line protective layers LPL1 and LPL2 may correspond to any one of the first via layer VIA1, the second via layer VIA2, and the pixel defining layer PDL. For example, when the first line protective layer LPL1 is formed of the same material through the same process as the first via layer VIA1, the second line protective layer LPL2 may be formed of the same material through the same process as the second via layer VIA2 or the pixel defining layer PDL. In another example, when the first line protective layer LPL1 is formed of the same material through the same process as the second via layer VIA2, the second line protective layer LPL2 may be formed of the same material through the same process as the pixel defining layer PDL.

The first and second line protective layers LPL1 and LPL2 and the first sensing insulating layer ISI1 may include a first opening OPN1 that exposes the second pattern IST1*b*.

The first pattern IST1*a* may be connected to the second pattern IST1*b* through the first opening OPN1. According to the present embodiment, a height of the second pattern IST1*b* positioned on one end of the first insulating layer group ING1 and the planarization layer FLT may be greater than a height of the second pattern IST1*b* positioned on the planarization layer FLT corresponding to the first trench TCH1.

Therefore, the first pattern IST1*a* and the second pattern IST1*b* may be directly connected to each other without another bridge line. Since a bridge line is not present, connection reliability between the first pattern IST1*a* and the second pattern IST1*b* is improved. In addition, since a length of the non-display area NDA may be reduced by a length of the bridge line, a dead space is reduced and a thin bezel is easily implemented.

A third pattern IST1*c* of the first sensing line IST1 may connect the first pad PDE1 and the second pattern ISTb to each other. The third pattern IST1*c* may be formed of the same material through the same process as the gate electrode GE of the transistor. According to an embodiment, the third pattern IST1*c* may be formed of the same material through the same process as the upper electrode UE. According to an embodiment, odd-numbered third pattern IST1*c* may be formed of the same material through the same process as the gate electrode GE of the transistor and even-numbered third pattern IST1*c* may be formed of the same material through the same process as the upper electrode UE. On the contrary, the even-numbered third pattern IST1*c* may be formed of the same material through the same process as the gate electrode GE of the transistor and the odd-numbered third pattern IST1*c* may be formed of the same material through the same process as the upper electrode UE. Therefore, a problem of short circuit between adjacent lines may be more efficiently prevented.

The second insulating layer group ING2 may include a second opening OPN2 that exposes the third pattern IST1*c*. In addition, the planarization layer FLT may include an opening corresponding to the second opening OPN2. The second pattern IST1*b* may be connected to the third pattern IST1*c* through the second opening OPN2.

Figure 16:
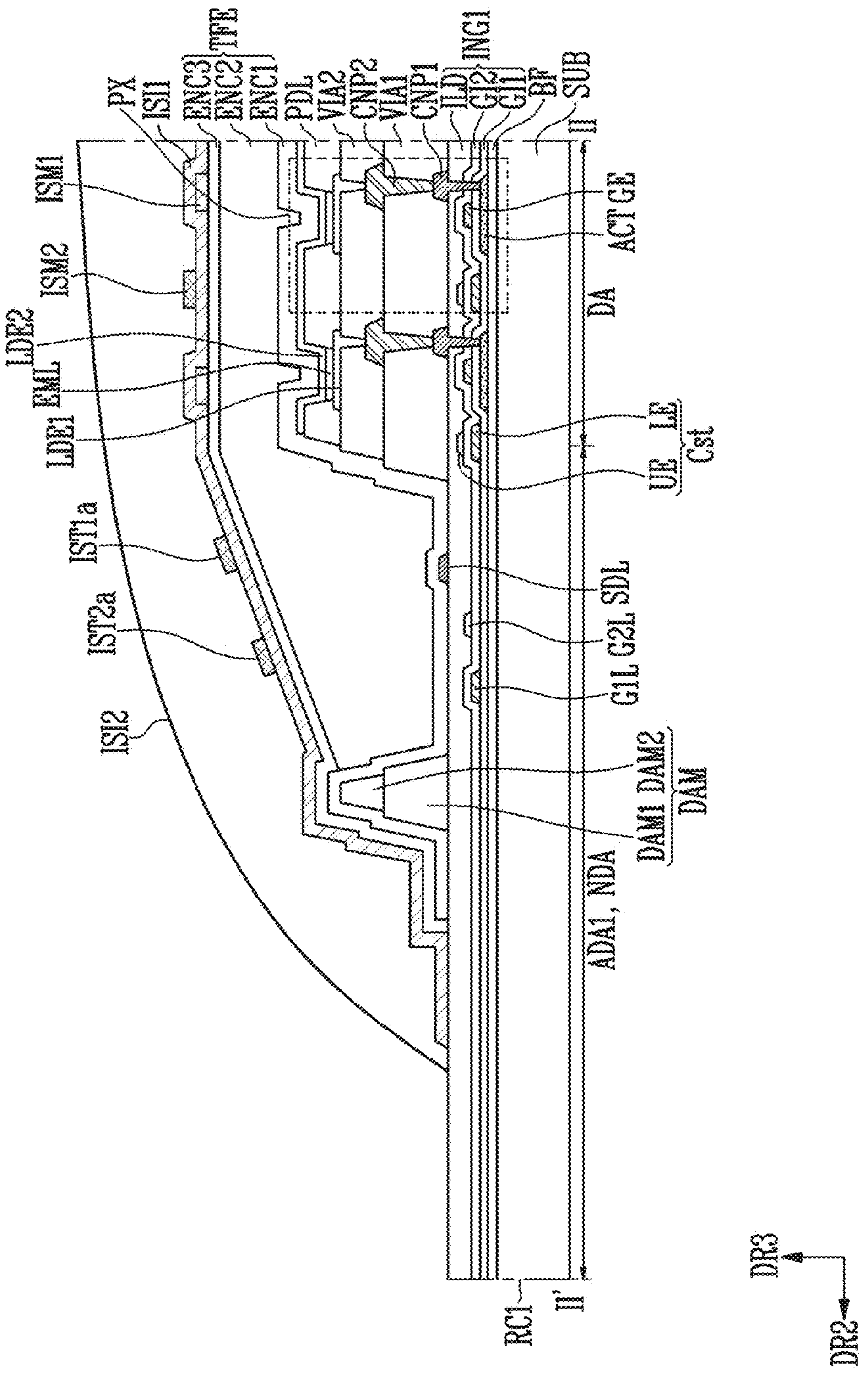

FIG. 16 is an embodiment of a cross-section taken along a line II-II' of FIG. 14.

The line II-II' of FIG. 14 may correspond to the first bending axis BX1. However, the same embodiment may be applied to the second side RC2 as well as the first side RC1.

The display lines DST may be configured of a single layer line or a multiple layer line using at least one of lines G1L, G2L, and SDL. The line G1L may be formed of the same material through the same process as the gate electrode GE. The line G2L may be formed of the same material through the same process as the upper electrode UE. The line SDL may be formed of the same material through the same process as the first connection pattern CNP1.

The patterns IST1*a* and IST12*a* of the sensing lines IST1 and IST2 may be positioned on the encapsulation layer TFE and the first sensing insulating layer ISI1 (in the third direction DR3) and may be positioned between the dam DAM and the display area DA (in the second direction DR2). The first sensing insulating layer ISI1 may be positioned between the encapsulation layer TFE and the sensing lines IST1 and IST2.

Figure 17:
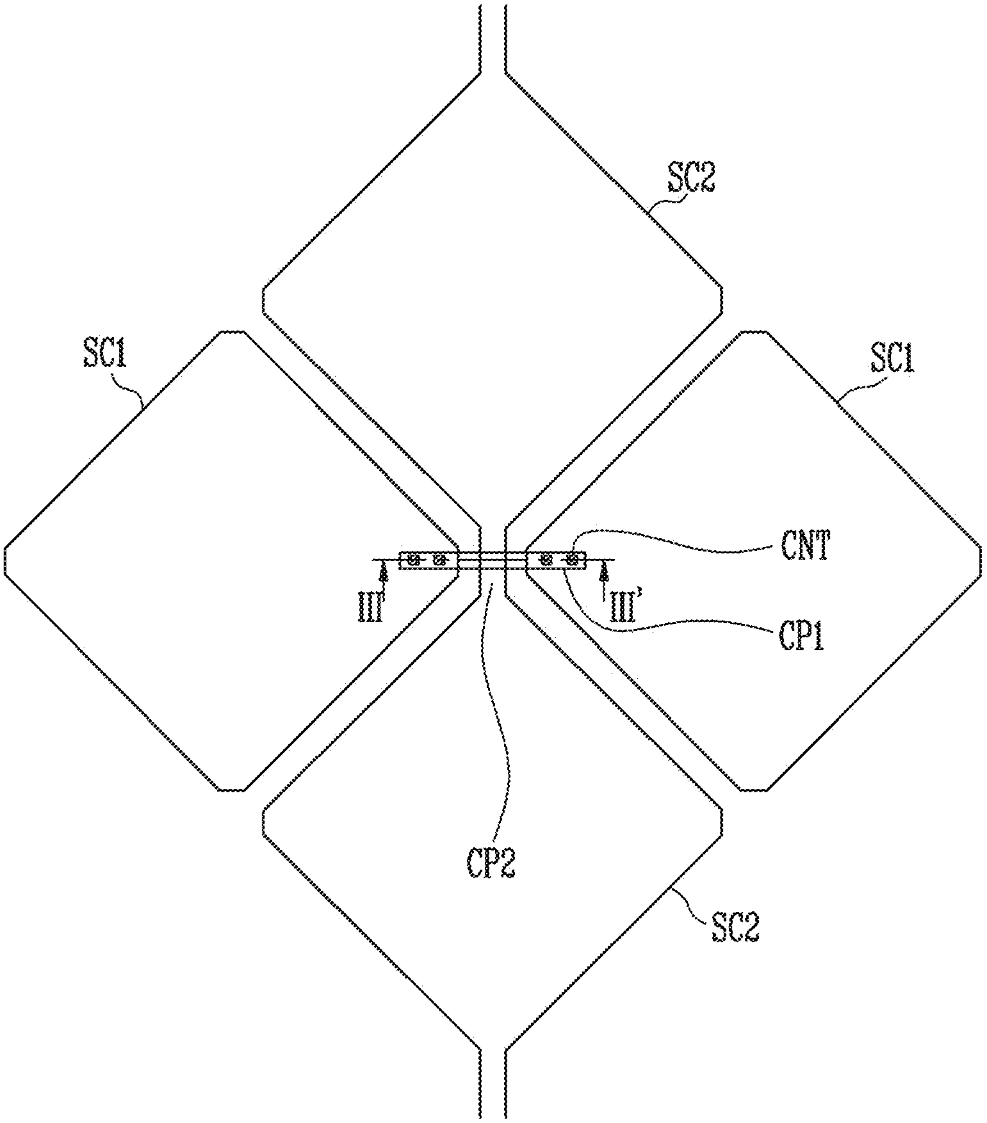
Figure 18:
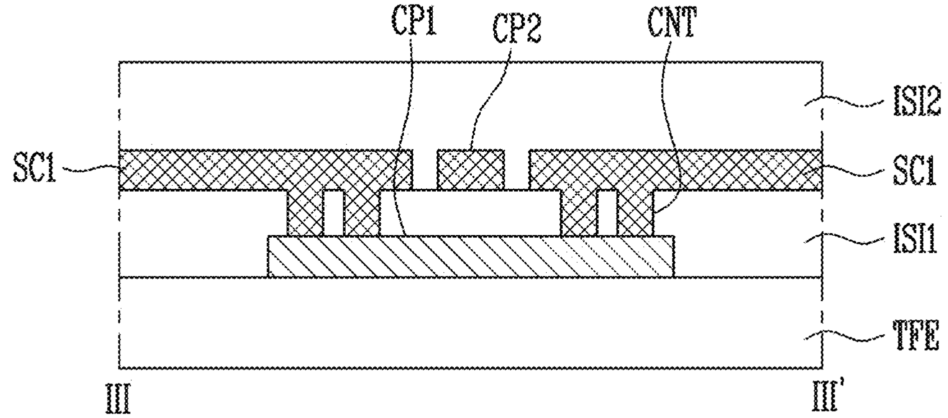

FIGS. 17 and 18 are diagrams illustrating sensing electrodes and bridge electrodes according to an embodiment of the disclosure. FIG. 18 is a cross-sectional view taken along a line III-III' of FIG. 17.

The bridge electrodes CP1 may be positioned on the encapsulation layer TFE by patterning the first sensing electrode layer ISM1.

The first sensing insulating layer ISI1 may cover the bridge electrode CP1 and may include contact holes CNT exposing a portion of the bridge electrodes CP1.

The first sensing electrodes SC1 and the second sensing electrodes SC2 may be formed on the first sensing insulating layer ISI1 by patterning the second sensing electrode layer ISM2. The first sensing electrodes SC1 may be connected to the bridge electrode CP1 through the contact holes CNT.

The second sensing electrodes SC2 may have a connection pattern CP2 in the same layer by patterning the second sensing electrode layer ISM2. Therefore, in connecting the second sensing electrodes SC2, a separate bridge electrode may be unnecessary.

According to an embodiment, each of the sensing electrodes SC1 and SC2 may cover the plurality of pixels PX. At this time, when each of the sensing electrodes SC1 and SC2 is configured of an opaque conductive layer, each of the sensing electrodes SC1 and SC2 may include a plurality of openings capable of exposing the plurality of covered pixels PX. For example, each of the sensing electrodes SC1 and SC2 may be configured in a mesh shape. When each of the sensing electrodes SC1 and SC2 is configured of a transparent conductive layer, each of the sensing electrodes SC1 and SC2 may be configured in a plate shape that does not include an opening.

Figure 19:
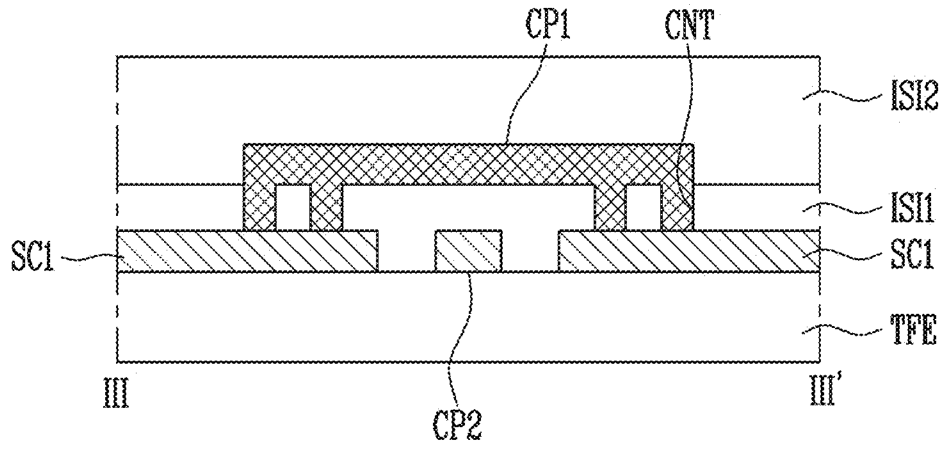

FIG. 19 is a diagram illustrating sensing electrodes and bridge electrodes according to another embodiment of the disclosure.

FIG. 19 is another cross-sectional view taken along the line III-III' of FIG. 17.

The first sensing electrodes SC1 and the second sensing electrodes SC2 may be formed on the encapsulation layer TFE by patterning the first sensing electrode layer ISM1.

The first sensing insulating layer ISI1 may cover the first sensing electrodes SC1 and the second sensing electrodes SC2 and may include contact holes CNT exposing a portion of the first sensing electrodes SC1.

The bridge electrodes CP1 may be positioned on the first sensing insulating layer ISI1 by patterning the second sensing electrode layer ISM2. The bridge electrodes CP1 may be connected to the first sensing electrodes SC1 through the contact holes CNT.

The drawings referred to so far and the detailed description of the disclosure described herein are merely examples of the disclosure, are used for merely describing the disclosure, and are not intended to limit the meaning and the scope of the disclosure described in claims. Therefore, those skilled in the art will understand that various modifications and equivalent other embodiments are possible from these.

Thus, the true scope of the disclosure should be determined by the technical spirit of the appended claims.

What is claimed is:

1. A sensor device comprising:

a sensor unit including a plurality of first sensor electrodes and a plurality of second sensor electrodes, wherein the plurality of first and second sensor electrodes are configured to form a plurality of capacitors at a plurality of intersections of the plurality of first and second sensor electrodes; and a sensor driver configured to transmit a plurality of driving signals to the plurality of first sensor electrodes and receive a plurality of sensing signals from the plurality of second sensor electrodes, wherein the sensor unit includes a plurality of sensing areas, wherein a number of the plurality of sensing areas is NA, which is an integer greater than 2, wherein the sensor driver is configured to:

time-divisionally sense each of the plurality of sensing areas once during a first sensing frame period, in a first order randomly determined for the first sensing frame period, wherein the first sensing frame period includes a plurality of first sensing periods, and a number of the plurality of first sensing periods is equal to the number of the plurality of sensing areas;

time-divisionally sense each of the plurality of sensing areas once during a second sensing frame period including a plurality of second sensing periods, in a second order randomly determined for the second sensing frame period, wherein a number of the plurality of second sensing periods is equal to the number of the plurality of sensing areas; and wherein the second sensing frame period is consecutive to the first sensing frame period, and an initial sensing area among the plurality of sensing areas during an initial second sensing period of the second sensing frame period is set to be different than a last sensing area among the plurality of sensing areas during a last first sensing period of the first sensing frame period.

2. The sensor device according to claim 1, wherein the first order in which each of the plurality of sensing areas is randomly sensed during the first sensing frame period is different from the second order in which each of the plurality of sensing areas is randomly sensed during the second sensing frame period.

3. The sensor device according to claim 1, wherein the plurality of first sensor electrodes are grouped into the plurality of sensing areas, and wherein each of the plurality of sensing areas has the same number of first sensor electrodes.

4. The sensor device according to claim 3, wherein the plurality of sensing areas share the plurality of second sensor electrodes.

5. The sensor device according to claim 1, wherein the sensor driver is configured to:

select and sense one of the plurality of sensing areas with a probability of (1/NA) during an initial first sensing period among the plurality of first sensing periods of the first sensing frame period.

6. The sensor device according to claim 5, wherein the sensor driver is configured to:

select and sense one of (NA−1) other sensing areas among the plurality of sensing areas with a probability of 1/(NA−1) during a following first sensing period, immediately after the initial first sensing period, among the plurality of first sensing periods of the first sensing frame period, and wherein the (NA−1) other sensing areas exclude the one of the plurality of sensing areas sensed during the initial first sensing period of the first sensing frame period.

7. The sensor device according to claim 6, wherein the sensor driver is configured to:

select and sense one of (NA−2) other sensing areas among the plurality of sensing areas with a probability of 1/(NA−2) during a third first sensing period, immediately after the following first sensing period, among the plurality of first sensing periods of the first sensing frame period, and wherein the (NA−2) other sensing areas exclude the one of the plurality of sensing areas sensed during the initial first sensing period of the first sensing frame period and the one of the (NA−1) other sensing areas sensed during the following first sensing period of the first sensing frame period.

8. The sensor device according to claim 5, wherein the sensor driver is configured to:

select and sense the initial sensing area among first (NA−1) sensing areas with a probability of 1/(NA−1) during the initial second sensing period of the second sensing frame period, and wherein the first (NA−1) sensing areas exclude the last sensing area sensed during the last first sensing period of the first sensing frame period.

9. The sensor device according to claim 8, wherein the sensor driver is configured to:

select and sense one of second (NA−1) sensing areas with a probability of 1/(NA−1) during a following second sensing period, immediately after the initial second sensing period, of the second sensing frame period, and wherein the second (NA−1) sensing areas include the last sensing area and exclude the initial sensing area of the first (NA−1) sensing areas.

10. The sensor device according to claim 9, wherein the sensor driver is configured to:

select and sense one of (NA−2) sensing areas with a probability of 1/(NA−2) during a third second sensing period, immediately after the following second sensing period, of the second sensing frame period, and wherein the (NA−2) sensing areas exclude the initial sensing area and the one of second (NA−1) sensing areas.

11. A method of driving a sensor device including a sensor unit, which includes a plurality of first sensor electrodes and a plurality of second sensor electrodes, wherein the plurality of first and second sensor electrodes are configured to form a plurality of capacitors at a plurality of intersections of the plurality of first and second sensor electrodes, and includes a plurality of sensing areas, a number of the plurality of sensing areas being NA (NA is an integer greater than 2), the method comprising:

time-divisionally sensing each of the plurality of sensing areas once during a first sensing frame period, in a first order randomly determined for the first sensing frame period, wherein the first sensing frame period includes a plurality of first sensing periods, and a number of the plurality of first sensing periods is equal to the number of the plurality of sensing areas; and time-divisionally sensing each of the plurality of sensing areas once during a second sensing frame period including a plurality of second sensing periods in a second order randomly determined for the second sensing frame period, wherein a number of the plurality of second sensing periods is equal to the number of the plurality of sensing areas, wherein the second sensing frame period is consecutive to the first sensing frame period, and an initial sensing area among the plurality of sensing areas during an initial second sensing period of the second sensing frame period is set to be different than a last sensing area among the plurality of sensing areas during a last first sensing period of the first sensing frame period.

12. The method according to claim 11, wherein the first order in which each of the plurality of sensing areas is randomly sensed during the first sensing frame period is different from the second order in which each of the plurality of sensing areas is randomly sensed during the second sensing frame period.

13. The method according to claim 11, wherein the plurality of first sensor electrodes are grouped into the plurality of sensing areas, and wherein each of the plurality of sensing areas has the same number of first sensor electrodes.

14. The method according to claim 13, wherein the plurality of sensing areas share the plurality of second sensor electrodes.

15. The method according to claim 11, wherein one of the plurality of sensing areas is selected and sensed with a probability of (1/NA) during an initial first sensing period among the plurality of first sensing periods of the first sensing frame period.

16. The method according to claim 15, wherein one of (NA−1) other sensing areas among the plurality of sensing areas is selected and sensed with a probability of 1/(NA−1) during a following first sensing period, immediately after the initial first sensing period, among the plurality of first sensing periods of the first sensing frame period, and wherein the (NA−1) other sensing areas exclude the one of the plurality of sensing areas sensed during the initial first sensing period of the first sensing frame period.

17. The method according to claim 16, wherein one of (NA−2) other sensing areas among the plurality of sensing areas is selected and sensed with a probability of 1/(NA−2) during a third first sensing period, immediately after the following first sensing period, among the plurality of first sensing periods of the first sensing frame period, and wherein the (NA−2) other sensing areas exclude the one of the plurality of sensing areas sensed during the initial first sensing period of the first sensing frame period and the one of the (NA−1) other sensing areas sensed during the following first sensing period of the first sensing frame period.

18. The method according to claim 15, wherein the initial sensing area among first (NA−1) sensing areas is selected and sensed with a probability of 1/(NA−1) during the initial second sensing period of the second sensing frame period, and wherein the first (NA−1) sensing areas exclude the last sensing area sensed during the last first sensing period of the first sensing frame period.

19. The method according to claim 18, wherein one of second (NA−1) sensing areas is selected and sensed with a probability of 1/(NA−1) during a following second sensing period, immediately after the initial second sensing period, of the second sensing frame period, and wherein the second (NA−1) sensing areas include the last sensing area and exclude the initial sensing area of the first (NA−1) sensing areas.

20. The method according to claim 19, wherein one of (NA−2) sensing areas is selected and sensed with a probability of 1/(NA−2) during a third second sensing period, immediately after the following second sensing period, of the second sensing frame period, and wherein the (NA−2) sensing areas exclude the initial sensing area and the one of second (NA−1) sensing areas.

* * * * *